US010790764B2

United States Patent
Adachi et al.

(10) Patent No.: US 10,790,764 B2
(45) Date of Patent: Sep. 29, 2020

(54) POWER CONVERSION DEVICE THAT LIMITS VOLTAGE VARIATION AMONG ENERGY STORAGE DEVICES

(71) Applicant: Mitsubishi Electric Corporation, Chiyoda-ku, Tokyo (JP)

(72) Inventors: Tomohiro Adachi, Tokyo (JP); Masahiro Hario, Tokyo (JP); Noriyuki Imada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/605,577

(22) PCT Filed: May 29, 2018

(86) PCT No.: PCT/JP2018/020542
§ 371 (c)(1),
(2) Date: Oct. 16, 2019

(87) PCT Pub. No.: WO2018/230327
PCT Pub. Date: Dec. 20, 2018

(65) Prior Publication Data
US 2020/0127583 A1 Apr. 23, 2020

(30) Foreign Application Priority Data
Jun. 13, 2017 (WO) .................. PCT/JP2017/021768

(51) Int. Cl.
*H02M 7/48* (2007.01)
*H02M 7/483* (2007.01)
(Continued)

(52) U.S. Cl.
CPC .............. *H02M 7/797* (2013.01); *H02J 3/36* (2013.01)

(58) Field of Classification Search
CPC ......... H02M 2007/4835; H02M 7/483; H02M 7/797; H02J 3/36; H02J 3/18
See application file for complete search history.

(56) References Cited

U.S. PATENT DOCUMENTS 5,742,493 A * 4/1998 Ito .......................... B60L 3/0023
363/37
9,780,556 B2 * 10/2017 Zhang ...................... H02M 1/32
(Continued)

FOREIGN PATENT DOCUMENTS

| JP | H07203631 A | 8/1995 |
|----|-------------|--------|
| JP | 2005065423 A | 3/2005 |
| JP | 2013507100 A | 2/2013 |

OTHER PUBLICATIONS

International Search Report (PCT/ISA/210) dated Aug. 1, 2017, by the Japan Patent Office as the International Searching Authority for International Application No. PCT/JP2017/021768.
(Continued)

*Primary Examiner* — Thienvu V Tran
*Assistant Examiner* — Sisay G Tiku
(74) *Attorney, Agent, or Firm* — Buchanan Ingersoll & Rooney PC

(57) ABSTRACT

A power conversion device includes an MMC-type power conversion circuit and a central controller. The central controller limits an active power command value and a reactive power command value to a value corresponding to an active power limit value and a value corresponding to a reactive power limit value, respectively, and controls an operation of the power conversion circuit according to the limited active power command value and the limited reactive power command value. The central controller includes: an index value calculation unit configured to calculate an index value that shows an extent of a variation among voltages of energy storage devices included in a plurality of
(Continued)

converter cells; and a limiter controller configured to change the active power limit value to a value smaller than the active power limit value when the index value exceeds a threshold value.

9 Claims, 14 Drawing Sheets

(51) Int. Cl.
*H02M 7/797* (2006.01)
*H02J 3/36* (2006.01)
*H02J 3/18* (2006.01)

(56) References Cited

U.S. PATENT DOCUMENTS

| | | | | |
|---|---|---|---|---|
| 10,153,711 | B2* | 12/2018 | Jimichi | H02M 1/32 |
| 10,205,402 | B2* | 2/2019 | Fujii | H02M 7/48 |
| 10,637,343 | B2* | 4/2020 | Fujii | H02M 7/483 |
| 2011/0019449 | A1* | 1/2011 | Katoh | H02M 1/088 |
| | | | | 363/124 |
| 2012/0195084 | A1 | 8/2012 | Norrga | |
| 2016/0336874 | A1* | 11/2016 | Kikuchi | H02M 7/483 |
| 2017/0047860 | A1* | 2/2017 | Fujii | H02M 7/2173 |

OTHER PUBLICATIONS

International Search Report (PCT/ISA/210) dated Aug. 7, 2018, by the Japan Patent Office as the International Searching Authority for International Application No. PCT/JP2018/020542.
Bjorn Jacobsen et al., "VSC-HVDC Transmission with Cascaded Two-Level Converter", Cigre Session 2010 (B4-110), Aug. 22, 2010, 8 pages.
Mohammed Merag Alam et al., "Effects of VSC based HVDC system on distance protection of transmission lines", International Journal of Electrical Power & Energy Systems, Jourdan Hill, Oxford, GB, vol. 92, May 26, 2017, pp. 245-260.
Colin Oates, "Modular Multilevel Converter Design for VSC HVDC Applications", IEEE Journal of Emerging and Selected Topics in Power Electronics, IEEE, Piscataway, NJ, USA, vol. 3, No. 2, Jun. 1, 2015, pp. 505-515.
Extended European Search Report dated May 25, 2020 issued in corresponding European Patent Application No. 18817130.0, 10 pages.

* cited by examiner

FIG.11
(A) P PRIORITY MODE
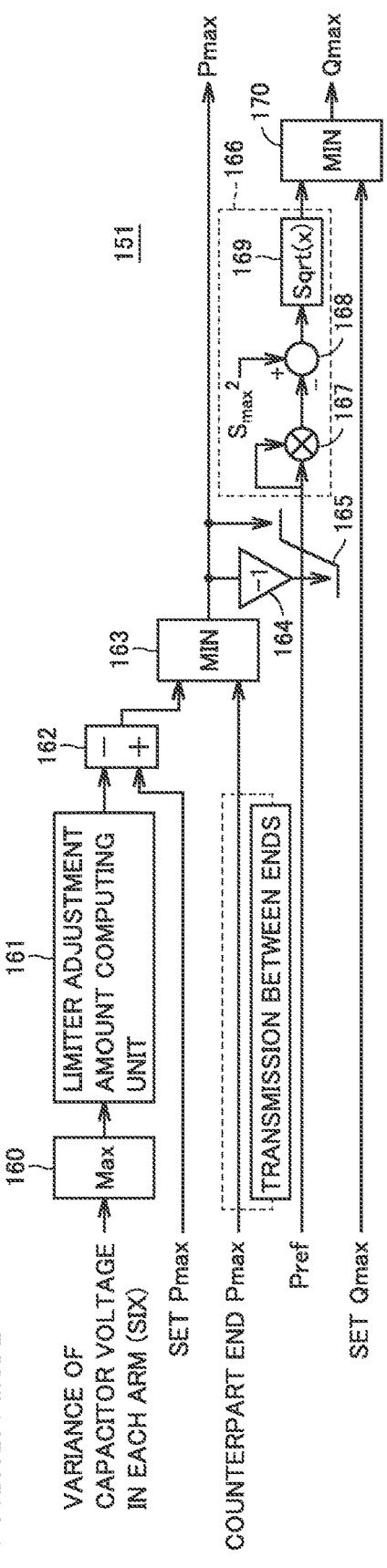
(B) Q PRIORITY MOD
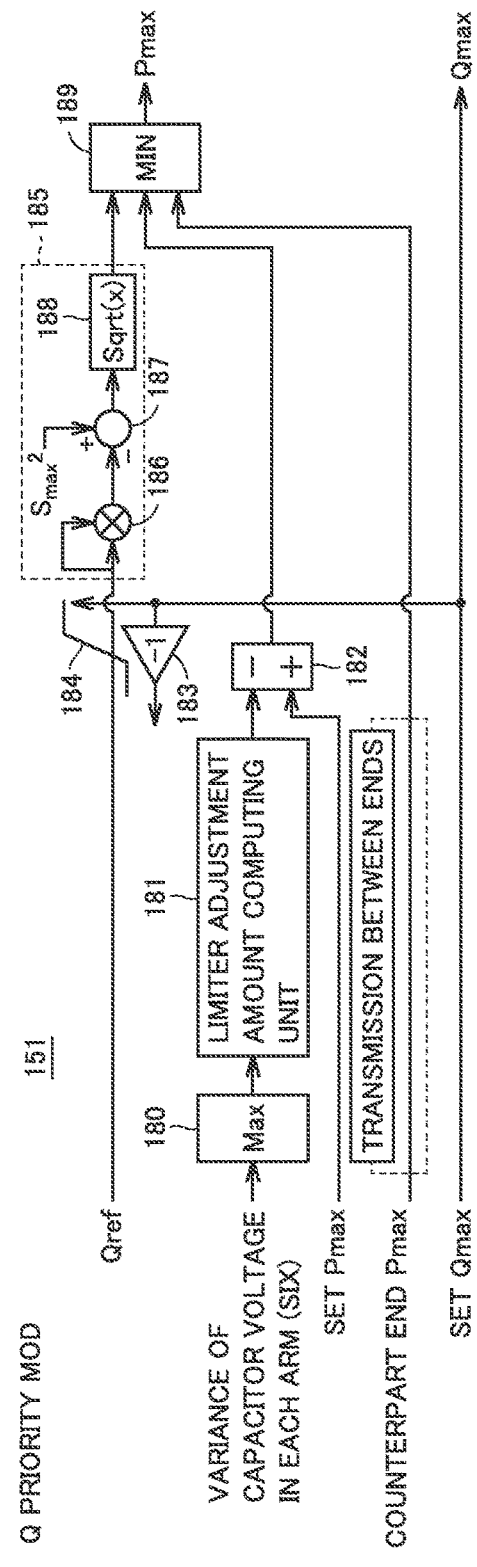

FIG.12
(A) P PRIORITY MODE
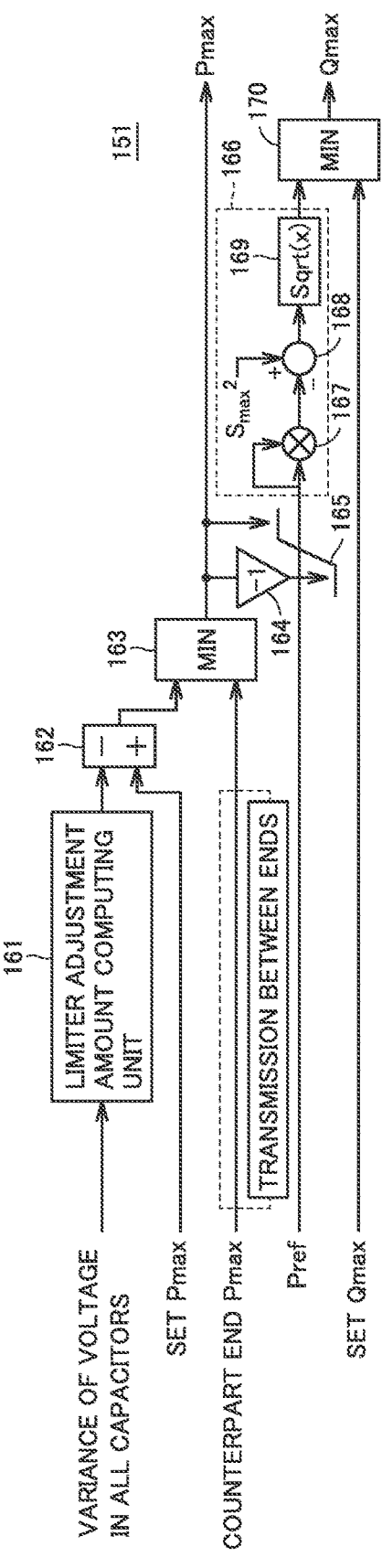
(B) Q PRIORITY MODE
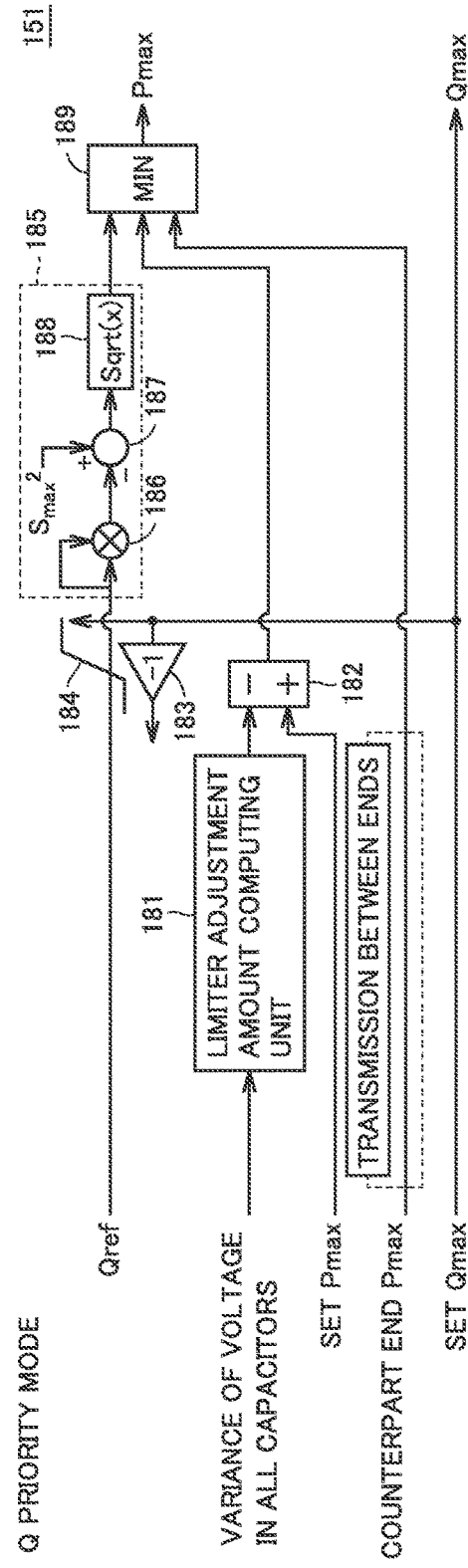

POWER CONVERSION DEVICE THAT LIMITS VOLTAGE VARIATION AMONG ENERGY STORAGE DEVICES

TECHNICAL FIELD

The present disclosure relates to a power conversion device that performs power conversion between an alternating-current (AC) circuit and a direct-current (DC) circuit, and, for example, is used in a high voltage direct current (HVDC) system, a back-to-back (BTB) system, and the like.

BACKGROUND ART

A voltage sourced converter (VSC) used in the HVDC system, the BTB system or the like functions as: a rectifier configured to convert an alternating current into a direct current; and an inverter configured to convert a direct current into an alternating current. The VSC can be formed using a modular multilevel converter (MMC).

Using an active power command value and a reactive power command value, the VSC can control the active power and the reactive power that are output to an AC power system (or that are input from the AC power system). In this case, the active power command value and the reactive power command value are limited by a limiter so as not to exceed the active power limit value and the reactive power limit value, respectively. An apparent power limit value can be calculated from the square root of the sum of: the square of the active power limit value; and the square of the reactive power limit value. This apparent power limit value is set at a fixed value in accordance with the device capacity (for example, see Japanese Patent Laying-Open No. 2005-65423 (PTL 1)).

The MMC has, in each phase of the alternating current, an upper arm connected to a positive-side DC terminal and a lower arm connected to a negative-side DC terminal. Each arm is formed by a cascade connection of a plurality of converter cells (also referred to as submodules).

Each of the converter cells includes an energy storage device formed of a DC capacitor or the like. The voltage across each energy storage device is feedback-controlled so as to be kept at a desired value (for example, see Japanese National Patent Publication No. 2013-507100 (PTL 2)).

CITATION LIST

Patent Literature

PTL 1: Japanese Patent Laying-Open No. 2005-65423
PTL 2: Japanese National Patent Publication No. 2013-507100

SUMMARY OF INVENTION

Technical Problem

In control of the MMC, regarding the voltage across the energy storage device provided in each of a large number of converter cells, it is important to maintain each voltage value at a desired value so as to keep a balance between the upper arm and the lower arm in each phase while keeping a balance among the phases. However, due to a fault in a DC circuit or an AC circuit, or due to a partial fault inside the MMC, the voltage across the energy storage device may vary among a large number of converter cells. When the variation in the voltage of the energy storage device exceeds a limit, feedback control becomes unstable. Thus, the continuous operation of the MMC may become difficult.

The present disclosure has been made in order to solve the above-described problems. An object of the present disclosure is to provide an MMC-type power conversion device capable of preventing a situation that a continuous operation becomes difficult since the variation among voltages of the energy storage devices provided in their respective converter cells exceeds a limit.

Solution to Problem

A power conversion device in one embodiment includes: a power conversion circuit configured to perform power conversion between an AC power system and a DC power system: and a central controller. The power conversion circuit includes a plurality of converter cells that are cascade-connected to each other. Each of the plurality of converter cells includes an energy storage device. The central controller is configured to limit an active power command value and a reactive power command value to a value corresponding to an active power limit value and a value corresponding to a reactive power limit value, respectively, and to control an operation of the power conversion circuit according to the limited active power command value and the limited reactive power command value. The central controller includes: an index value calculation unit configured to calculate an index value that shows an extent of a variation among voltages of the energy storage devices included in the plurality of converter cells; and a limiter controller configured to change the active power limit value to a value smaller than the active power limit value when the index value exceeds a threshold value.

Advantageous Effects of Invention

According to the above-described embodiment, when the index value showing the extent of the variation among the voltages of the energy storage devices exceeds a threshold value, the active power limit value is changed to a value smaller than the active power limit value. Thus, the operation of the power conversion device can be continued.

BRIEF DESCRIPTION OF DRAWINGS

FIG. 11 is a block diagram showing the operation of a limit value computing unit in FIG. 9.

FIG. 12 is a block diagram showing the operation of the limit value computing unit as a modification in FIG. 11.

DESCRIPTION OF EMBODIMENTS

Figure 1:
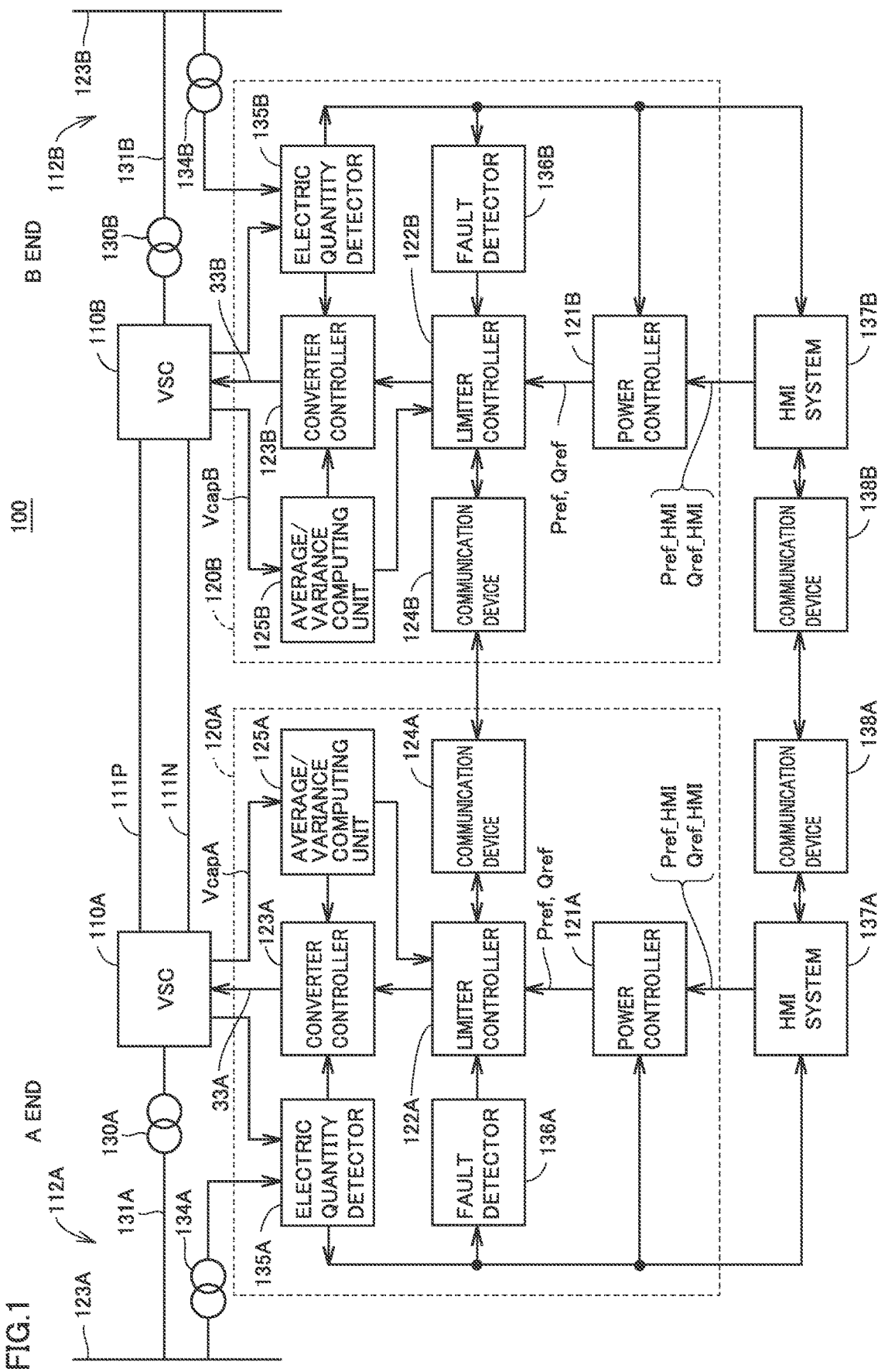
FIG. 1 is a block diagram showing the configuration of a power conversion system.

Each of the embodiments will be hereinafter described in detail with reference to the accompanying drawings, in which the same or corresponding components will be designated by the same reference characters, and description thereof will not be repeated.

First Embodiment

[Entire Configuration of Power Conversion System]

FIG. 1 is a block diagram showing the configuration of a power conversion system. In the following explanation, each device on the A end side of DC power transmission lines 111P and 111N will be denoted by a reference numeral with a suffix of A while each device on the B end side of DC power transmission lines 111P and 111N will be denoted by a reference numeral with a suffix of B. The configuration of each device on the A end side is approximately the same as the configuration of each device on the B end side. Thus, in the explanation about the devices on both the A end side and the B end side, the devices will be denoted by their reference numerals with no suffix of A or B. Also, the device on the A end side may be referred to as the first device while the device on the B end side may be referred to as the second device.

Referring to FIG. 1, a power conversion system 100 includes: a first voltage sourced converter (VSC) 110A connected between an AC power system 112A on the A end side and DC power transmission lines 111P, 111N; and a second voltage sourced converter (VSC) 110B connected between an AC power system 112B on the B end side and DC power transmission lines 111P, 111N. VSC 110 will be also referred to as a power conversion device.

AC power system 112 is a three-phase AC power system but is shown as one power line in FIG. 1 for the sake of simplifying illustration. AC power system 112 may be referred to as an AC circuit while DC power transmission lines 111P and 111N may be collectively referred to as a DC circuit 111 (or a DC power system 111).

DC power transmission lines 111P and 111N include a positive-side DC power transmission line 111P and a negative-side DC power transmission line 111N. When power conversion system 100 corresponds to an HVDC system, DC power transmission lines 111P and 111N each have a length of several tens of kilometers to several hundreds of kilometers, for example. When power conversion system 100 corresponds to a BTB system, DC power transmission lines 111P and 111N each have a length of several meters to several tens of meters, for example. FIG. 1 shows the case where the DC power system has two terminals.

VSC 110 is a self-excited power converter and is connected through an interconnection transformer 130 to AC power system 112 on its own end side. VSC 110 functions as a rectifier converting an alternating current into a direct current and as an inverter converting a direct current into an alternating current. In the present embodiment, VSC 110 is formed of an MMC. The details of the configuration of an MMC-type VSC 110 will be described with reference to FIGS. 2 to 6.

Power conversion system 100 further includes a central controller 120, a voltage transformer 134, an HMI system 137, and a communication device 138 each as a device provided at each of the A end and the B end.

Figure 7:
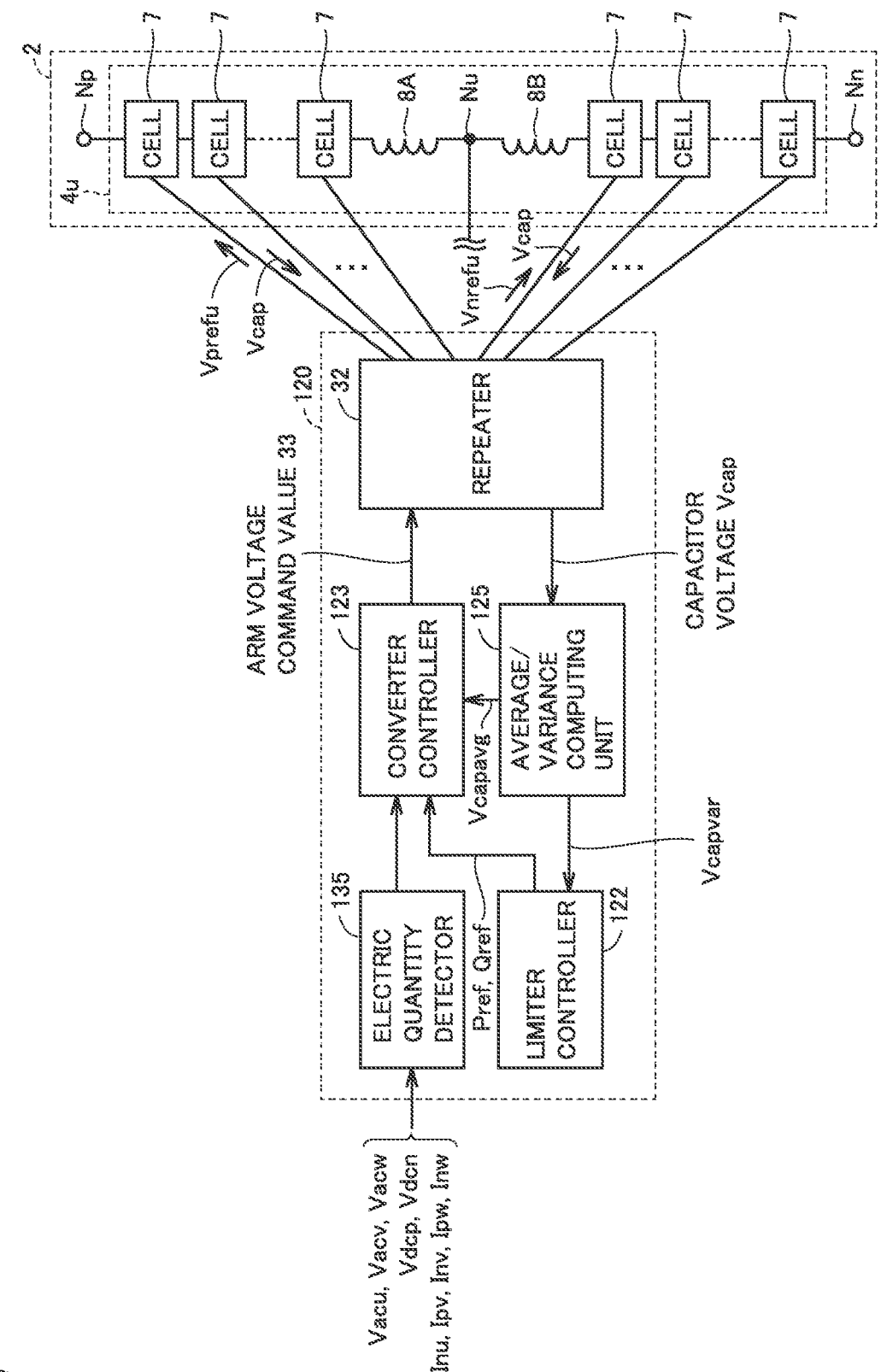
FIG. 7 is a diagram for illustrating an input/output (I/O) signal of a converter controller in FIG. 1.

A first central controller 120A provided at the A end controls the operation of first VSC 110A on the A end side. A second central controller 120B provided at the B end controls the operation of a second VSC 110B on the B end side. As shown in FIG. 1, each central controller 120 includes a power controller 121, a limiter controller 122, a converter controller 123, a communication device 124, an average/variance computing unit 125, an electric quantity detector 135, and a fault detector 136. Each central controller 120 may further include a repeater 32 as shown in FIG. 7. The functions of these components will be described later.

Power controller 121, limiter controller 122, convener controller 123, average/variance computing unit 125, and fault detector 136 may be formed of a dedicated circuit or may be formed of a field programmable gate array (FPGA), or at least some of the functions thereof may be implemented based on a microcomputer including a central processing unit (CPU) and memory. In this case, at least some of the functions are implemented by the CPU executing the program stored in the memory, or may be implemented by a combination of a dedicated circuit or an FPGA with a microcomputer.

Voltage transformer 134 is placed in order to obtain the information about the AC voltage in AC power system 112 on its own end side. Specifically, voltage transformer 134 is placed in a bus bar 132 to which an AC power transmission line 131 is connected. In the present specification, a current and a voltage may be collectively referred to as an electric quantity.

Electric quantity detector 135 is connected to voltage transformer 134 and configured to detect an instantaneous value of the AC voltage in AC power system 112 on its own end side. Furthermore, electric quantity detector 135 is connected to arm current detectors 9A and 9B in a leg circuit 4 in each phase and DC voltage detectors 11A and 11B, which will be described later with reference to FIG. 2. Electric quantity detector 135 performs analog-to-digital (A/D) conversion of: the instantaneous value of the detected AC voltage, the instantaneous value of the arm current, and the DC voltage value. Thereby, the time series data of the AC voltage in each phase, the arm current in each phase and the DC voltage is generated.

Furthermore, electric quantity detector 135 calculates an AC current in each phase based on the detection values of arm currents Ipu, Inu, Ipv, Inv, Ipw, and Inw in their respective phases. The specific calculation method will be described in the explanation with reference to FIG. 7.

In addition, the AC current in each phase is not calculated based on the detection value of the arm current in each phase, but the AC current in each phase of AC power system 112 may be directly detected using an AC current detector such as a current transformer. In this ease, electric quantity detector 135 is connected to the AC current detector and performs A/D conversion of the instantaneous value of the detected AC current. Thereby, the time series data of the AC current in each phase is generated.

Electric quantity detector 135 outputs the eventually obtained time series data about the AC current and the AC voltage to converter controller 123, fault detector 136, HMI system 137, and power controller 121 that are located on its own end side. Furthermore, electric quantity detector 135 outputs the time series data about the DC voltage and the arm current to converter controller 123 on its own end side.

Based on the voltage value of AC power system 112 on its own end side that has been received from electric quantity detector 135, fault detector 136 detects whether the AC voltage in AC power system 112 on its own end side has abruptly changed or not. For example, based on the fact that the peak value of the AC voltage has not reached a set value (a lower limit value) (that is, an undervoltage), fault detector 136 may detect an abrupt change in the AC voltage. Alternatively, based on the fact that the detection value of the AC voltage has exceeded a set value (an upper limit value) (that is, an overvoltage), fault detector 136 may detect an abrupt change in the AC voltage. Fault detector 136 outputs, to limiter controller 122 on its own end side, the information as to whether the AC voltage has abruptly changed or not in AC power system 112 on its own end side.

HMI system 137 is a terminal device formed using a computer, for example, and used as a human machine interface (HMI) or a device for monitoring and controlling the power converter. HMI system 137 receives inputs of an active power command value Pref_HMI and a reactive power command value Qref_HMI in VSC 110 on its own end side, and outputs the received active power command value Pref_HMI and reactive power command value Qref_HMI to central controller 120 on its own end side.

Communication devices 138A and 138B are used for transmission of information between HMI system 137A at the A end and HMI system 137B at the B end. Specifically, HMI systems 137A and 137B exchange, with each other, the information about: the time series data of the electric quantity; active power command value Pref_HMI and reactive power command value Qref_HMI.

In addition, HMI system 137 does not have to be formed as a separate configuration at each of the A end and the B end, but may be formed as a single configuration. In this case, communication devices 138A and 138B as described above are not required.

[Details of Configuration of Central Controller]

The following is a further detailed explanation about power controller 121, limiter controller 122, converter controller 123, communication device 124, and average/variance computing unit 125 that constitute central controller 120.

Power controller 121 generates an active power command value Pref and a reactive power command value Qref based on active power command value Pref_HMI and reactive power command value Qref_HMI set by a user and received from HMI system 137 on its own end side, and also based on the time series data of the electric quantity up to the present time in AC power system 112 on its own end side. For example, power controller 121 generates active power command value Pref by adding a variation amount ΔPref that is based on the time series data of the electric quantity to active power command value Pref_HMI set by the user. Similarly, power controller 121 generates reactive power command value Qref by adding a variation amount ΔQref that is based on the time series data of the electric quantity to reactive power command value Qref_HMI set by the user.

In addition, each of active power command value Pref and reactive power command value Qref may be positive or negative. For example, the relation may be defined such that VSC 110 outputs active power to AC power system 112 when active power command value Pref is positive and AC power system 112 inputs active power to VSC 110 when active power command value Pref is negative (this relation may be reversed depending on the manner of definition). Furthermore, the relation may be defined such that reactive power of delay is supplied to AC power system 112 when reactive power command value Qref is positive and reactive power of delay is consumed from AC power system 112 when reactive power command value Qref is negative (this relation may be reversed depending on the manner of definition).

In this case, the command value of the active power that is input into VSC 110A from AC power system 112A on the A end side needs to be equal to the command value of the active power that is output to AC power system 112B from VSC 110B on the B end side. Similarly, the command value of the active power that is output to AC power system 112A from VSC 110A on the A end side needs to be equal to the command value of the active power that is input into VSC 110B from AC power system 112B on the B end side. The reason thereof will be described below.

In a self-excited power conversion system, power and voltage are balanced by power control at one end of the A end and the B end and by voltage control at the other end. Thus, the active power command value is directly used for control only at the power-control end at which power control is performed. In contrast, reactive power control is performed separately at both ends. Accordingly, when the active power command value used at the power-control end is not kept also at the voltage-control end at which voltage control is performed, it cannot be ensured that the active power command value and the reactive power command value do not exceed the converter capacity. Therefore, active power command value Pref on the A end side and active power command value Pref on the B end side need to match with each other while an active power limit value Pmax on the A end side and an active power limit value Pmax on the B end side need to be equal to each other.

The above-mentioned matching between active power command values Pref at the A end and the B end and the above-mentioned matching between active power limit values at the A end and the B end can be implemented, for example, in the manner as described below.

As described above, power controller 121A on the A end side and power controller 121B on the B end side share the information about active power command value Pref_HMI, reactive power command value and the electric quantity at each end. Thus, each power controller 121 can calculate the same active power command value Pref based on these pieces of information. When active power command values Pref obtained by calculation on its own end side and the counterpart end side do not match with each other due to influences of a communication delay and the like, each power controller 121 can correct active power command value Pref on one end side based on active power command value Pref on the other end side. When one of central controllers 120A and 120B is set as a master while the other one is set as a slave, active power command value Pref on the slave side may be determined based on active power command value Pref on the master side.

Alternatively, central controllers 120A and 120B may share the information about active power command value Pref on the A end side and the information about active power command value Pref on the B end side through communication devices 124A and 124B. In this case, when active power command values Pref on its own end side and the counterpart end side do not match with each other, each limiter controller 122 determines active power command value Pref on one end side based on active power command value Pref on the other end side.

Active power command value Pref and reactive power command value Qref that are set as described above are input into limiter controller 122. When active power command value Pref deviates from an appropriate range (that is, a lower limit value: −Pmax, and an upper limit value: ±Pmax) that is based on limit value Pmax, limiter controller 122 limits active power command value Pref to the lower limit value (−Pmax) or the upper limit value (+Pmax). Similarly, when reactive power command value Qref deviates from an appropriate range (that is, a lower limit value: −Qmax and an upper limit value: +Qmax) that is based on a limit value Qmax, limiter controller 122 limits reactive power command value Qref to the lower limit value (−Qmax) or the upper limit value (+Qmax). Thereby, active power command value Pref and reactive power command value Qref can be prevented from exceeding the device capacity of VSC 110. Limiter controller 122 outputs, to converter controller 123, active power command value Pref limited by the limiter and reactive power command value Qref limited by the limiter. Further details about the operation of limiter controller 122 will be described later in FIG. 9.

Based on active power command value Pref and reactive power command value Qref that are input from limiter controller 122, converter controller 123 generates a control signal for controlling VSC 110 on its own end side and outputs the generated control signal to VSC 110 on its own end side. Specifically, in the case of a MMC-type VSC 110, converter controller 123 outputs a voltage command value for an arm circuit in each phase, which forms an MMC. Further details about the operation of converter controller 123 will be described with reference to FIGS. 7 and 8.

Communication devices 124A and 124B are used for transmission of information between limiter controller 122A on the A end side and limiter controller 122B on the B end side. In the first embodiment, limiter controllers 122A and 122B exchange, with each other, the information about active power limit value Pmax and the information about the operation mode of limiter controller 122 (that is, the information as to whether a P priority mode is selected or a Q priority mode is selected).

From each of converter cells constituting VSC 110 on its own end, average/variance computing unit 125 obtains the information showing the voltage value across the capacitor as an energy storage device (which will be hereinafter also referred to as a "cell capacitor voltage"). Average/variance computing unit 125, for example, calculates the average value of the cell capacitor voltage in each arm and calculates a variance as an index value that shows the extent of the variation in the cell capacitor voltage. Average/variance computing unit 125 outputs the calculated average value of the cell capacitor voltage to converter controller 123 on its own end side, and outputs the calculated variance as a variation index value to limiter controller 122 on its own end side. In the present disclosure, average/variance computing unit 125 is also referred to as an index value calculation unit for calculating the index value of the variation in the cell capacitor voltage.

[Schematic Configuration of MMC-Type VSC]

Figure 2:
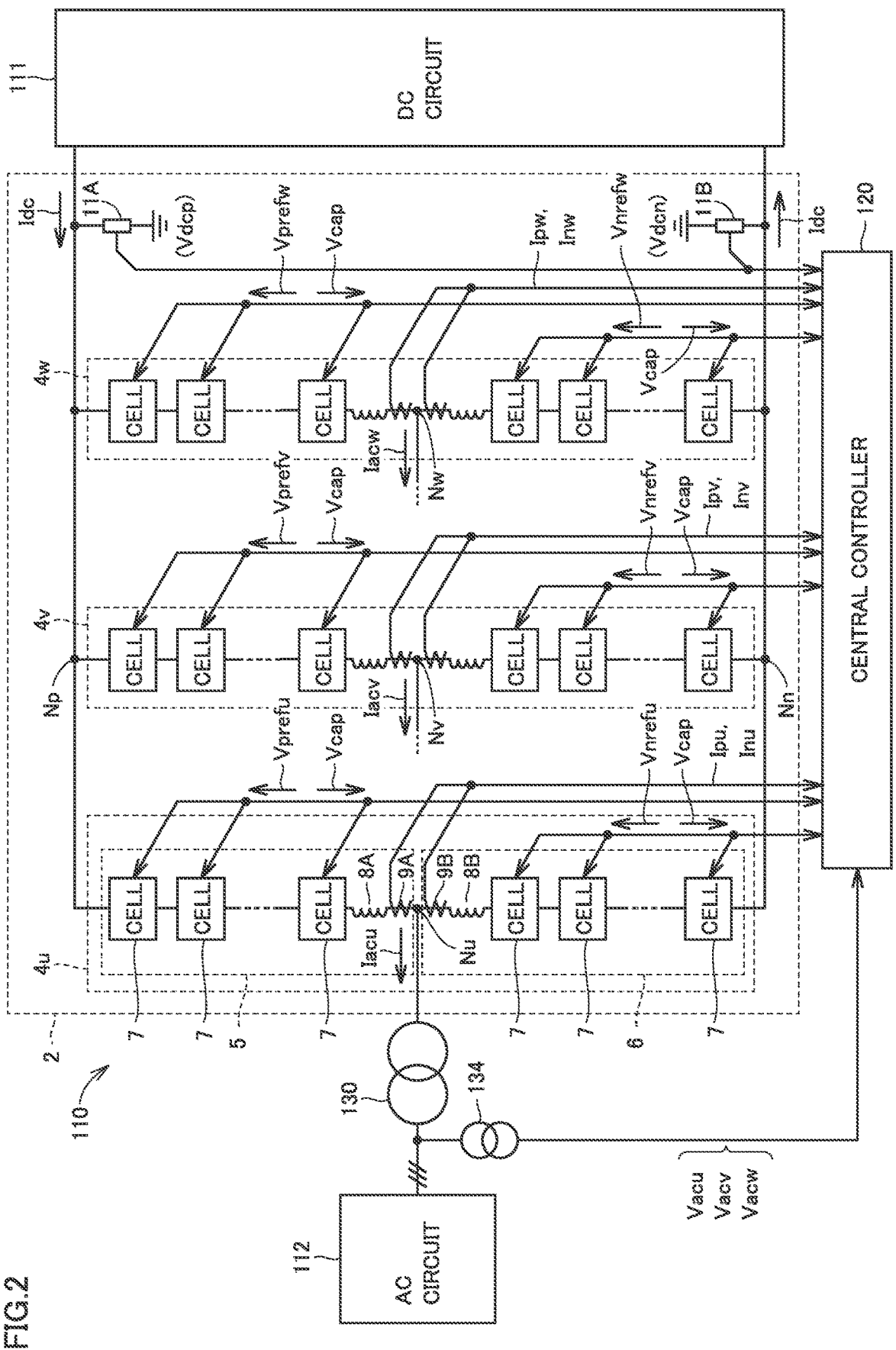
FIG. 2 is a schematic configuration diagram of an MMC-type VSC in FIG. 1.

FIG. 2 is a schematic configuration diagram of an MMC-type VSC in FIG. 1. Referring to FIG. 2, VSC 110 includes leg circuits 4u, 4v, and 4w (also referred to as a leg circuit 4 unless specifically defined), each of which serves as a main circuit, and a central controller 120. In the present specification, leg circuits 4u, 4v, and 4w will be entirely referred to as a power conversion circuit 2.

Leg circuit 4 is provided in each phase of a plurality of phases that form an alternating current and connected between an AC circuit 112 and a DC circuit 111 to perform power conversion between these circuits. FIG. 2 shows the case where AC circuit 112 is a three-phase alternating current, in which three leg circuits 4u, 4v, and 4w are provided so as to correspond to a u-phase, a v-phase, and a w-phase, respectively.

AC terminals Nu, Nv, and Nw provided in leg circuits 4u, 4v, and 4w, respectively, are connected to AC circuit 112 through interconnection transformer 130. AC circuit 112 is an AC power system including an AC power supply and the like, for example. FIG. 2 does not show a connection between interconnection transformer 130 and each of AC terminals Nv, Nw for the sake of simplifying illustration.

DC terminals Np and Nn (that is, a positive-side DC terminal Np and a negative-side DC terminal Nn) that are provided in common in each leg circuit 4 are connected to DC circuit 111.

DC circuit 111 is a DC terminal of a DC power system including a DC power transmission network and the like or another power conversion device, for example. The latter case provides a configuration of a (back-to-back) system for coupling two power conversion devices to thereby connect the AC power systems having different rated frequencies and the like.

In place of using interconnection transformer 130 in FIG. 2, a connection may be established through an interconnection reactor to AC circuit 112.

Figure 3:
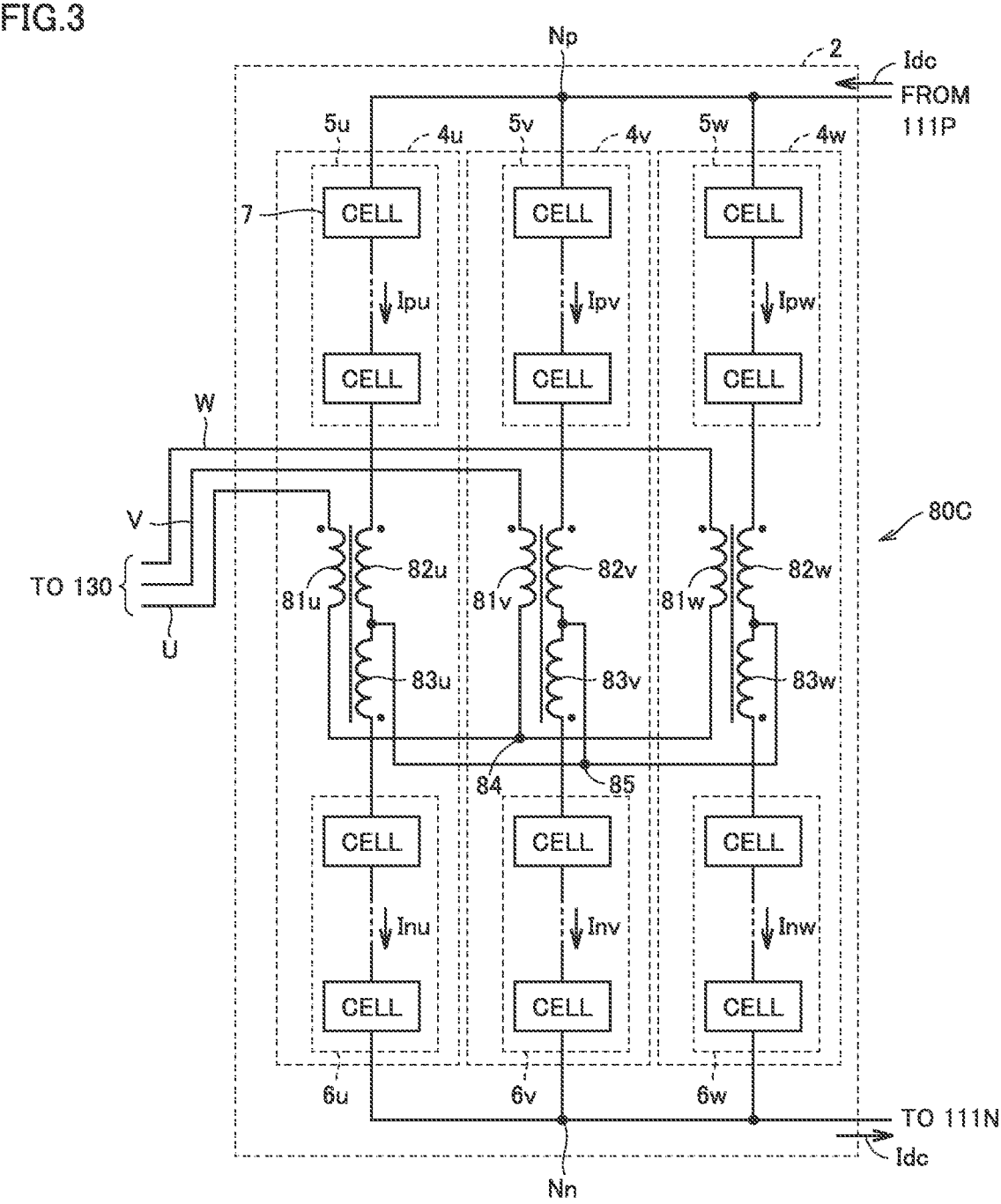
FIG. 3 is a diagram showing, a modification of a connection portion between an AC circuit and each leg circuit.

Furthermore, leg circuits 4u, 4v, and 4w may be provided with primary windings in place of AC terminals Nu, Nv, and Nw, respectively, such that leg circuits 4u, 4v, and 4w are connect to interconnection transformer 130 or an interconnection reactor in an AC manner through a secondary winding magnetically coupled with the primary windings. In this case, the primary windings may be reactors 8A and 8B as described below. In other words, leg circuit 4 is electrically (i.e., in a DC manner or an AC manner) connected to AC circuit 112 through connection portions, such as AC terminals Nu, Nv, and Nw or the above-mentioned primary windings, provided in leg circuits 4u, 4v, and 4w. FIG. 3 specifically illustrates an example in which power conversion circuit 2 and AC circuit 112 are connected in an AC manner.

Leg circuit 4u is divided into an upper arm 5 extending from positive-side DC terminal Np to AC input terminal Nu and a lower arm 6 extending from negative-side DC terminal Nn to AC input terminal Nu. A connecting point (that is, terminal Nu) between upper arm 5 and lower arm 6 is connected to interconnection transformer 130. Positive-side DC terminal Np and negative-side DC terminal Nn are connected to DC circuit 111. Since leg circuits 4v and 4w have a similar configuration, leg circuit 4u will be representatively described below.

Upper arm 5 includes a plurality of cascade-connected converter cells 7 and a reactor 8A. The plurality of converter cells 7 and reactor 8A are connected in series to each other. In the following, converter cell 7 may be referred to as a cell 7 for the sake of simplicity.

Similarly, lower arm 6 includes a plurality of cascade-connected cells 7 and a reactor 8B. The plurality of converter cells 7 and reactor 8B are connected in series to each other.

Reactor 8A may be inserted at any position in upper arm 5 of leg circuit 4u. Reactor 8B may be inserted at any position in lower arm 6 of leg circuit 4u. A plurality of reactors 8A and a plurality of reactors 8B may be provided. The reactors may have different inductance values. Furthermore, only reactor 8; of upper arm 5 may be provided or only reactor 8B of lower arm 6 may be provided.

Reactors 8A and 8B are provided so as to prevent a fault current from abruptly increasing in the event of a fault in AC circuit 112, DC circuit 111 or the like. However, excessively high inductance values of reactors 8A and 8B cause a problem that the efficiency of the power converter deteriorates.

As described above, central controller 120 receives inputs of detection signals of a U-phase AC voltage Vacu, a V-phase AC voltage Vacv, and a W-phase AC voltage Vacw from voltage transformer 134.

Furthermore, central controller 120 receives inputs of: the voltage at positive-side DC terminal Np detected by DC voltage detector 11A; and the voltage at negative-side DC terminal Nn detected by DC voltage detector 11B.

Furthermore, central controller 120 receives inputs of the detection value of an upper arm current Ipu and the detection value of a lower arm current Inn that are detected by arm current detectors 9A and 9B, respectively, provided in U-phase leg circuit 4u. Similarly, central controller 120 receives inputs of the detection value of an upper arm current Ipv and the detection value of a lower arm current Inv that are detected by arm current detectors 9A and 9B, respectively, provided in V-phase leg circuit 4v. Furthermore, central controller 120 receives inputs of the detection value of an upper arm current Ipw and the detection value of a lower arm current Inv that are detected by arm current detectors 9A and 9B, respectively, provided in NV-phase leg circuit 4w.

Furthermore, central controller 120 receives the signal showing the detection value of a cell capacitor voltage Vcap from each cell 7.

Based on these detection signals, central controller 120 outputs arm voltage command values Vprefu, Vnrefu, Vprefv, Vprefw, and Vnrefw for controlling the operation state of each cell 7. In the present embodiment, arm voltage command values Vprefu, Vnrefu, Vprefv, Vnrefv, Vprefw, and Vnrefw are generated so as to correspond to a U-phase upper arm, a U-phase lower arm, a V-phase upper arm, a V-phase lower arm, a W-phase upper arm, and a W-phase lower arm, respectively. In the following description, arm voltage command values Vprefu, Vnrefu, Vprefv, Vnrefv, Vprefw, and Vnrefw will be referred to as an arm voltage command value 33 collectively or unless otherwise specified.

For the sake of simplifying illustration in FIG. 2, the signal line of the signal that is input into central controller 120 from each detector and the signal line of the signal that is input and output between central controller 120 and each cell 7 are partially collectively illustrated, but actually provided separately for each detector and for each cell 7. The signal line between each cell 7 and central controller 120 for transmission and the signal line between each cell 7 and central controller 120 for reception may be separately provided. Also in the present embodiment, these signals are transmitted through an optical fiber in terms of noise resistance.

[Modification of Connection Portion Between AC Circuit and Each Leg Circuit]

FIG. 2 shows an example in which AC circuit 112 and power conversion circuit 2 are connected in a DC manner through AC terminals Nu, Nv, and Nw provided in leg circuits 4u, 4v, and 4w, respectively. Instead, AC circuit 112 and each leg circuit 4 may be connected in an AC manner through a transformer. In the following, a specific example will be described with reference to FIG. 3.

FIG. 3 is a diagram showing a modification of a connection portion between an AC circuit and each leg circuit. Referring to FIG. 3, AC circuit 112 is connected to leg circuits 4u, 4v, and 4w through a three-phase transformer 80C of three windings.

Specifically, primary windings 81u, 81v, and 81w of three-phase transformer 80C in FIG. 3 each have one end connected to a corresponding one of U-phase, V-phase and W-phase power transmission lines of AC circuit 112 through interconnection transformer 130. Primary windings 81u, 81v, and 81w of three-phase transformer 80C each have the other end connected to a common neutral point 84. Specifically, in FIG. 3, primary windings 81u, 81v, and 81w are V-connected.

Secondary windings 82u, 82v, and 82w of three-phase transformer 80C are magnetically coupled to primary windings 81u, 81v, and 81w, respectively, through a common iron core. Three-phase transformer 80C in FIG. 3 is further provided with tertiary windings 83u, 83v, and 83w connected in series to secondary windings 82u, 82v, and 82w, respectively. The secondary windings in phases and their respective tertiary windings are connected so as to be reversed in polarity and are wound around a common iron core. Furthermore, the connection portions between the secondary windings in phases and their respective tertiary windings are connected to a common neutral point 85.

Furthermore, secondary winding 82u and tertiary winding 83u are connected in series to U-phase arm circuits 511 and 6u. Secondary winding 82v and tertiary winding 83v are connected in series to V-phase arm circuits 5v and 6v. Secondary winding 82w and tertiary winding 83w are connected in series to W-phase arm circuits 5w and 6w. In FIG. 3, each of secondary windings 82u, 82v, and 82w and each of tertiary windings 83u, 83v, and 83w serve as reactors 8p and 8n in each phase. Secondary windings 82u, 82v, and 82w and tertiary windings 83u, 83v, and 83w in three-phase transformer 80C may be provided separately from reactors 8p and 8n.

According to three-phase transformer 80C in FIG. 3, the DC electromotive force occurring in the secondary winding and the electromotive force occurring in the tertiary winding cancel out each other due to the arm current in each phase U-phase: Ipu, Inu, V-phase: Ipv, Inv, and W-phase: Ipw, Inw), which leads to an advantage that no DC magnetic flux occurs in the iron core.

[Configuration Example of Converter Cell]

Figure 4:
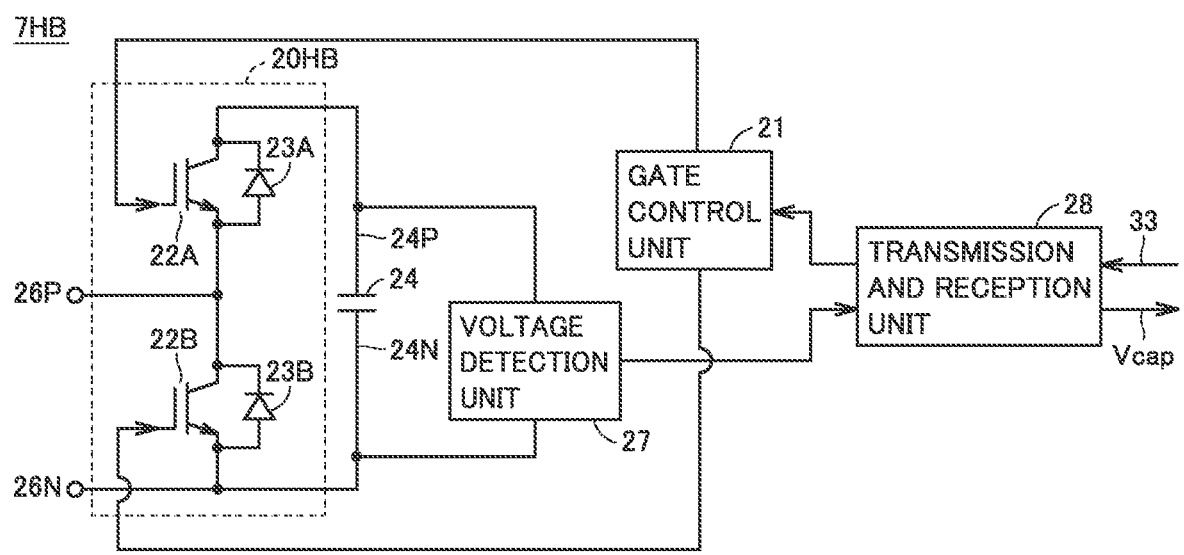
FIG. 4 is a circuit diagram showing an example of one of converter cells constituting each leg circuit in FIG. 2.

FIG. 4 is a circuit diagram showing an example of one of converter cells constituting each leg circuit in FIG. 2. A converter cell 7HB shown in FIG. 4 includes: a half bridge-type conversion circuit 20HB, a DC capacitor 24 as an energy storage device, a gate control unit 21, a voltage detection unit 27, and a transmission and reception unit 28.

Half bridge-type conversion circuit 20HB includes: semiconductor switching elements 22A and 22B (Which may be hereinafter simply referred to as a switching element) that are connected in series to each other; and diodes 23A and 23B. Diodes 23A and 23B are connected in anti-parallel with (that is, in parallel and in the reverse bias direction) switching elements 22A and 22B, respectively. DC capacitor 24 is connected in parallel with a series connection circuit of switching elements 22A and 22B and configured to hold a DC voltage. A connection node between switching elements 22A and 22B is connected to an terminal 26P on the high-potential side (the positive side). A connection node between switching element 22B and DC capacitor 24 is connected to an I/O terminal 26N on the low-potential side (the negative side).

Gate control unit 21 operates according to an arm voltage command value 33 received from central controller 120 in FIG. 2. For example, gate control unit 21 compares arm voltage command value 33 with a carrier signal such as a triangular wave, to thereby generate a pulse width modulation signal, and output the generated signal to the gates of semiconductor switching elements 22A and 22B.

Gate control unit 21 performs control such that one of switching elements 22A and 22B is in an ON state and the other switching element is in an OFF state during a normal operation (that is, when a zero voltage or a positive voltage is output between I/O terminals 26P and 26N). When switching element 22A is in an ON state and switching element 22B is in an OFF state, a voltage across DC capacitor 24 is applied between I/O terminals 26P and 26N. In contrast, when switching element 22A is in an OFF state and switching element 22B is in an ON state, the voltage between I/O terminals 26P and 26N is 0 V. Thus, converter cell 7 shown in FIG. 4 brings switching elements 22A and 22B alternately into an ON state, so that a positive voltage depending on a zero voltage or the voltage in DC capacitor 24 can be output. Diodes 23A and 23B are provided so as to provide protection when a reverse voltage is applied to switching elements 22A and 22B.

On the other hand, when central controller 120 in FIG. 2 detects an overcurrent of the arm current, gate control unit 21 brings each of switching elements 22A and 22B into an OFF state for circuit protection. As a result, for example, in the event of a ground fault in DC circuit 111, a fault current flows through diode 23B.

Voltage detection unit 27 detects a voltage between opposite ends 24P and 24N of DC capacitor 24. In the following description, the voltage on DC capacitor 24 will also be referred to as a cell capacitor voltage. Transmission and reception unit 28 transmits arm voltage command value 33 received from central controller 120 in FIG. 2 to gate control unit 21 and also transmits a signal showing a cell capacitor voltage Vcap detected by voltage detection unit 27 to central controller 120.

Gate control unit 21, voltage detection unit 27, and transmission and reception unit 28 described above may be formed of a dedicated circuit or may be formed utilizing, a field programmable gate array (FPGA) or the like.

Figure 5:
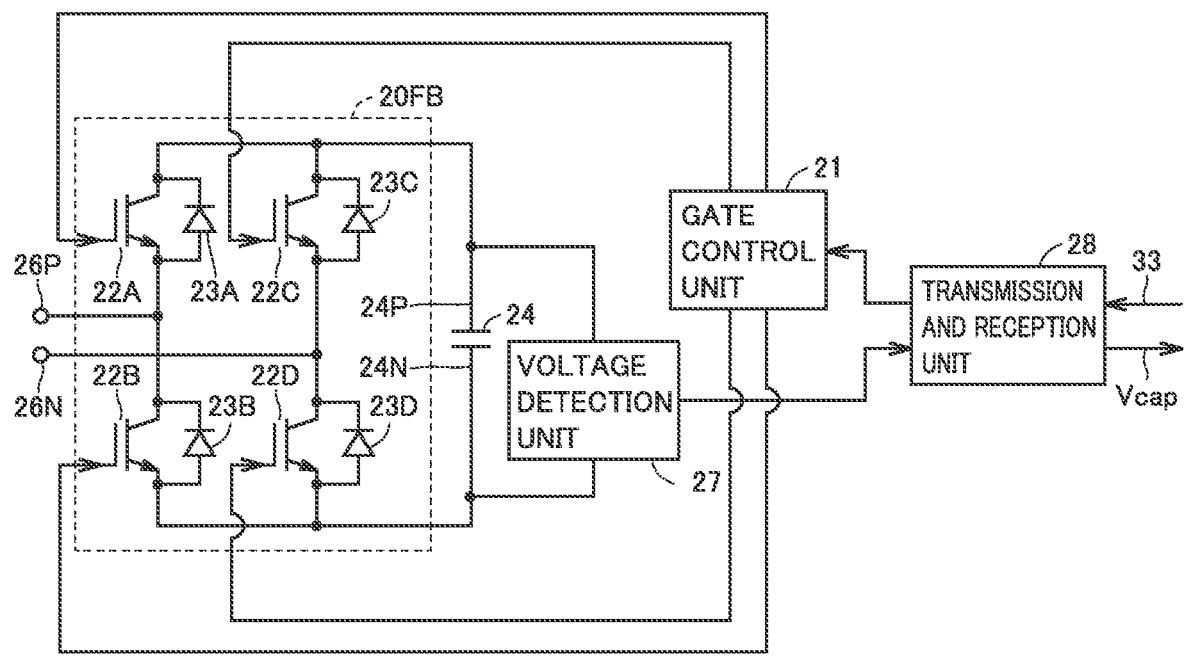
FIG. 5 is a circuit diagram showing another example of one of converter cells constituting each leg circuit in FIG. 2.

FIG. 5 is a circuit diagram showing another example of one of converter cells constituting each leg circuit in FIG. 2. A converter cell 7FB shown in FIG. 5 includes a full bridge-type conversion circuit 20FB, a DC capacitor 24 as an energy storage device, a gate control unit 21, a voltage detection unit 27, and a transmission and reception unit 28.

Full bridge-type conversion circuit 20FB is different from converter cell 7HB FIG. 4 in that it further includes switching elements 22C and 22D that are connected in series, and diodes 23C and 23D that are connected in anti-parallel to switching elements 22C and 22D, respectively. Switching elements 22C and 22D are entirely connected in parallel to a series connection circuit of switching elements 22A and 22B, and also connected in parallel to DC capacitor 24. I/O terminal 26P is connected to a connection node between switching elements 22A and 22B while 110 terminal 26N is connected to a connection node between switching elements 22C and 22D.

Gate control unit 21 operates according to arm voltage command value 33 received from central controller 120 in FIG. 2. For example, gate control unit 21 compares aria voltage command value 33 with a carrier signal such as a triangular wave, to thereby generate a pulse width modulation signal and output the generated signal to the gates of semiconductor switching elements 22A and 22B.

Gate control unit 21 performs control such that switching element 22D is continuously in an ON state, switching element 22C is continuously in an OFF state, and switching elements 22A and 22B are alternately in an ON state during a normal operation (that is, when a zero voltage or a positive voltage is output between I/O terminals 26P and 26N). It is to be noted that full bridge-type conversion circuit 20FB shown in FIG. 5 can also output a zero voltage or a negative voltage (that is, a reverse voltage) by bringing switching element 22D into an OFF state, bringing switching element 22C into an ON state, and bringing switching elements 22A and 22B alternately into an ON state.

On the other hand, when central controller 120 in FIG. 2 detects an overcurrent of the arm current, gate control unit 21 brings all of switching elements 22A to 22D into an OFF state for circuit protection. In this case, for example, in the event of a short-circuit fault in DC circuit 111, a short-circuit current flows through diodes 23C and 23B and thereby flows into capacitor 24. A fault current stops flowing at the point of time when the voltage in DC circuit 111 becomes equal to the sum of the voltages of capacitors 24 in the entire leg circuit 4.

Since the configurations of voltage detection unit 27 and transmission and reception unit 28 in FIG. 5 are the same as those in FIG. 4, the description thereof will not be repeated.

Figure 6:
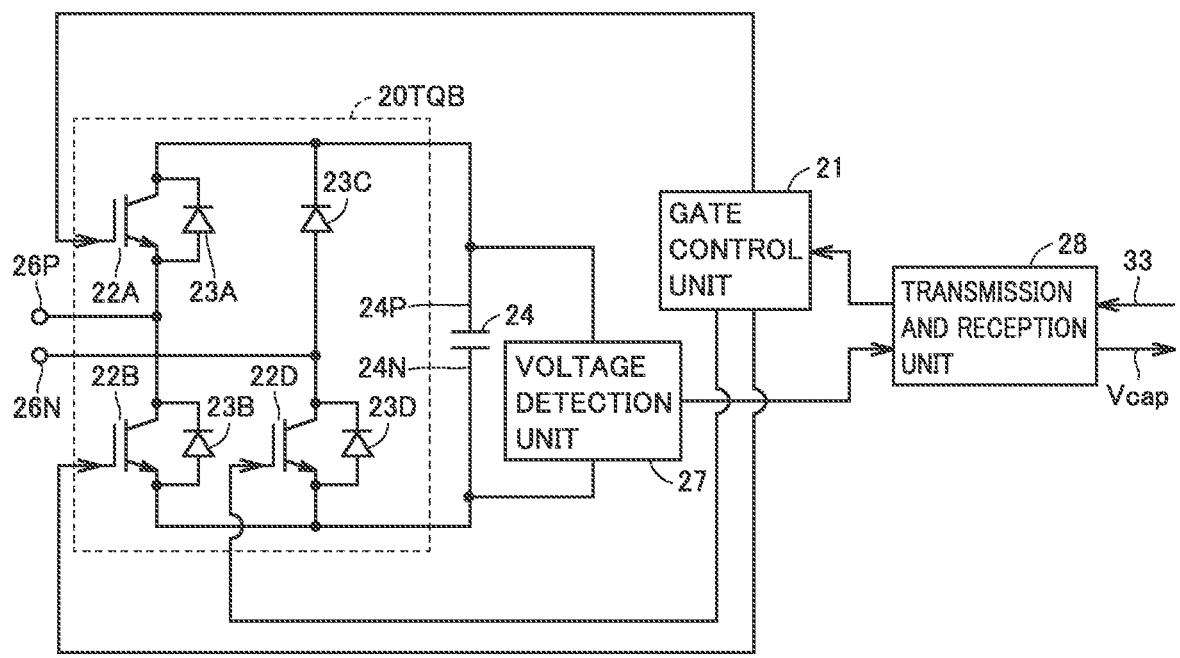
FIG. 6 is a circuit diagram showing still another example of one of converter cells constituting each leg circuit in FIG. 2.

FIG. 6 is a circuit diagram showing still another example of one of converter cells constituting each leg circuit in FIG. 2. A converter cell 7TQB shown in FIG. 6 includes a three quarter bridge-type conversion circuit 20TQB, a DC capacitor 24 as an energy storage device, a gate control unit 21, a voltage detection unit 27, and a transmission and reception unit 28.

Three quarter bridge-type conversion circuit 20TQB is different from full bridge-type conversion circuit 20FB shown in FIG. 5 in that it does not include switching element 22C, hut is the same as that shown in FIG. 5.

Gate control unit 21 operates according to arm voltage command value 33 received from central controller 120 in FIG. 2. For example, gate control unit 21 compares arm voltage command value 33 with a carrier signal such as a triangular wave, to thereby generate a pulse width modulation signal and output the generated signal to the gates of semiconductor switching elements 22A and 22B.

Gate control unit 21 performs control such that switching element 220 is continuously in an ON state, and switching elements 22A and 22B are alternately in an ON state during a normal operation that is, when a zero voltage or a positive voltage is output between I/O terminals 26P and 26N). It is to be noted that conversion circuit 20TQB shown in FIG. 6 can output a negative voltage when switching elements 22A and 22D each are in the OFF state and switching element 22B is in the ON state, and when a current flows in the direction from I/O terminal 26N to I/O terminal 26P.

On the other hand, when central controller 120 in FIG. 2 detects an overcurrent of the arm current, gate control unit 21 brings all of switching elements 22A to 22C into an OFF state for circuit protection. In this case, for example, in the event of a ground fault in DC circuit 111, a fault current flows through diodes 23C and 23B and thereby flows into capacitor 24. A fault current stops flowing at the point of time when the voltage in DC circuit 111 becomes equal to the sum of the voltages of capacitors 24 in the entire leg circuit 4.

Since the configurations of voltage detection unit 27 and transmission and reception unit 28 in FIG. 6 are the same as those in FIG. 4, the description thereof will not be repeated.

A self-arc-extinguishing-type switching element capable of controlling both the ON operation and the OFF operation is used for each of switching elements 22A, 22B, 22C, and 22D shown in FIGS. 4 to FIG. 6. For example, insulated gate bipolar transistors (IGBT) or gate commutated turn-off thyristors (GCT) are used as switching elements 22A, 22B, 22C, and 22D.

In each leg circuit 4 in FIG. 2, only one type of cell converters shown in FIGS. 4 to 6 may be used or various types of cell converters may be combined.

[Configuration and Operation of Convener Controller]

FIG. 7 is a diagram for illustrating an I/O signal of a converter controller in FIG. 1. FIG. 7 shows only some of the components in central controller 120, which serve to directly exchange a signal with converter controller 123. FIG. 7 representatively shows only U-phase leg circuit 4u in power conversion circuit 2 in FIG. 2, but the same is applied as will to other leg circuits 4v and 4w.

Referring to FIG. 7, electric quantity detector 135 receives signals showing a U-phase AC voltage Vacu, a V-phase AC voltage Vacv, and a NV-phase AC voltage Vacw from voltage transformer 134. Furthermore, electric quantity detector 135 receives signals showing a U-phase upper arm current Ipu and an U-phase lower arm current Inu from arm current detectors 9A and 9B, respectively, provided in U-phase leg circuit 4u. Similarly, electric quantity detector 135 receives signals showing a V-phase upper arm current Ipv and a V-phase lower arm current Inv from arm current detectors 9A and 9B, respectively, provided in V-phase leg circuit 4v, and also receives signals showing a W-phase upper arm current Ipw and a W-phase lower arm current Inw from arm current detectors 9A and 9B, respectively, provided in W-phase leg circuit 4w. Furthermore, electric quantity detector 135 receives signals showing DC voltages Vdcp and Vdcn from DC voltage detectors 11A and 11B, respectively.

Electric quantity detector 135 performs A/D conversion of these analog signals to generate time series data. Furthermore, electric quantity detector 135 calculates the AC current in each phase using the arm current in each phase.

Specifically, a U-phase AC current Iacu can be calculated using U-phase upper arm current Ipu and U-phase lower arm current Inu by the following equation.

$$Iacu=Ipu-Inu \quad (1A)$$

Similarly, a V-phase AC current Iacv can be calculated using V-phase upper arm current Ipv and V-phase lower arm current Inv by the following equation.

$$Iacv=Ipv-Inv \quad (1B)$$

W-phase AC current Iacw can be calculated using W-phase upper arm current Ipw and W-phase lower arm current Inw by the following equation.

$$Iacw=Ipw-Inw \quad (1C)$$

As described above, the AC current in each phase is not calculated based on the detection value of the arm current in each phase, but the AC current in each phase of AC power system 112 may be directly detected using an AC current detector such as a current transformer. In this case, electric quantity detector 135 is connected to an AC current detector and performs A/D conversion of the instantaneous value of the detected AC current to thereby generate a digital value showing the value of the AC current in each phase.

From electric quantity detector 135, converter controller 123 receives digital data of: AC voltages Vacu, Vacv, and Vacw; DC voltages Vdcp and Vdcn; and arm currents Ipu, Inu, Ipv, Inv, Ipw, and Inw that are detected by the detectors as described with reference to FIGS. 1 and 2. Furthermore, converter controller 123 receives digital data of AC currents Iacu, Iacv, and Iacw calculated using the arm currents.

Furthermore, converter controller 123 receives active power command value Pref and reactive power command value Qref from limiter controller 122. These active power command value Pref and reactive power command value Qref are limited by active power limit value Pmax and reactive power limit value Qmax, respectively.

Average/variance computing unit 125 receives an input of the detection value of cell capacitor voltage Vcap through repeater 32 from each of converter cells 7 that constitute power conversion circuit 2. Average/variance computing unit 125 calculates an average value Vcapavg of cell capacitor voltage Vcap in each arm, and calculates a variance Vcapvar as an index value that shows the variation in cell capacitor voltage Vcap. Average/variance computing unit 125 outputs the calculated average value Vcapavg of cell capacitor voltage Vcap to converter controller 123, and outputs the calculated variance Vcapvar of cell capacitor voltage Vcap to limiter controller 122.

As will be specifically described with reference to FIG. 9, when variance Vcapvar of the cell capacitor voltage exceeds the threshold value, limiter controller 122 changes active power command value Pref to a smaller value. This can prevent a situation that control of VSC 110 becomes unstable since the variation m cell capacitor voltage Vcap increases beyond the limit.

Based on the value of the electric quantity detected by each detector, active power command value Pref, reactive power command value. Qref, and average value Vcapavg of the cell capacitor voltage, converter controller 123 generates and outputs arm voltage command value 33 (Vprefu, Pnrefu, Vprefv, Vnrefv, Vprefw, Vnrefw).

Repeater 32 transfers arm voltage command value 33 generated by converter controller 123 to each converter cell 7. Specifically, repeater 32 outputs arm voltage command value Vprefu to each of converter cells 7 constituting U-phase upper arm 5u, and outputs Virefu to each of convener cells 7 constituting U-phase lower arm 6u. Similarly, repeater 32 outputs arm voltage command value Vprefv to each of converter cells 7 constituting V-phase upper arm 5v, and outputs Vnrefv to each of converter cells 7 constituting V-phase lower arm 6v. Repeater 32 outputs arm voltage command value Vprefw to each of converter cells 7 constituting W-phase upper arm 5w, and outputs Vnrefw to each of converter cells 7 constituting W-phase lower arm 6w.

Figure 8:
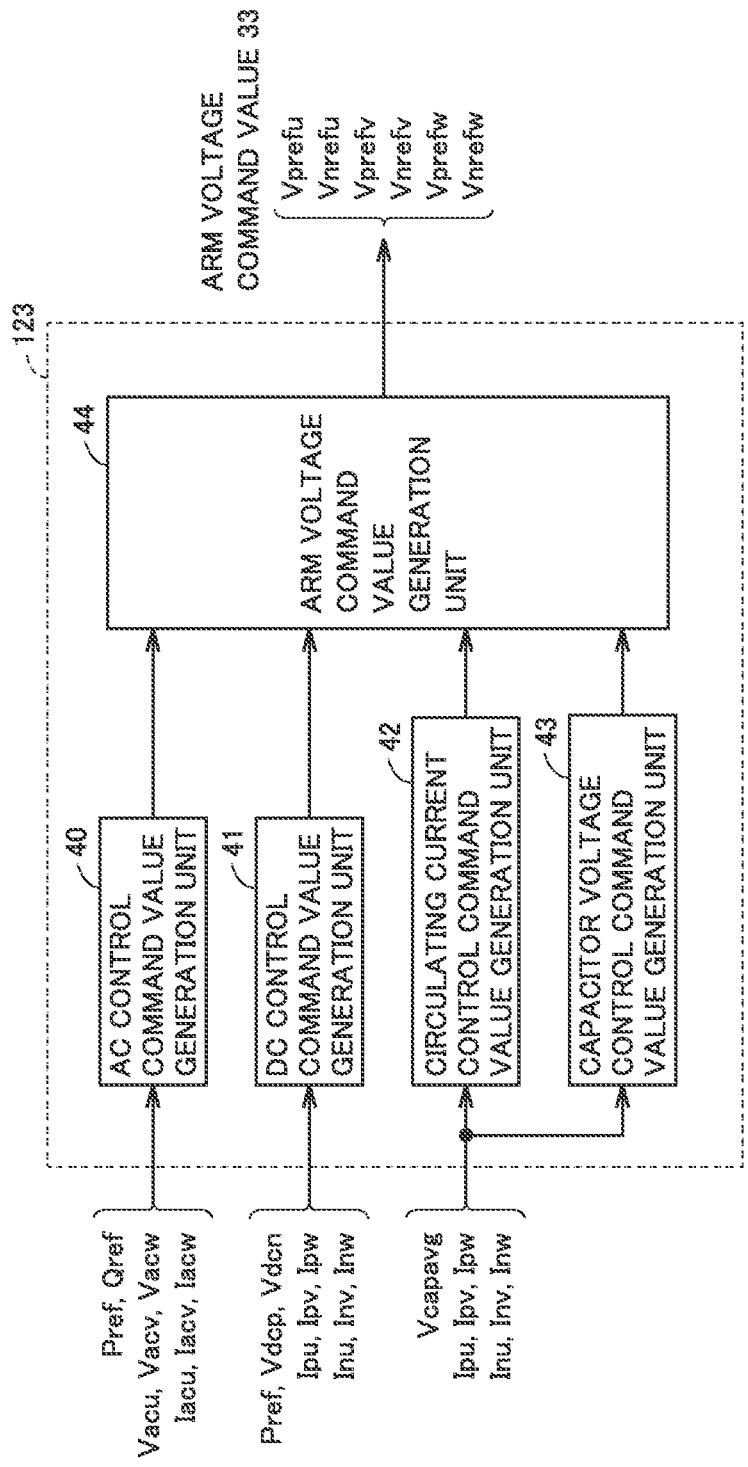
FIG. 8 is a block diagram showing an example of the configuration of a converter controller 123 in FIG. 7.

FIG., 8 is a block diagram showing an example of the configuration of converter controller 123 in FIG. 7. Referring to FIG. 8, convener controller 123 includes an AC control command value generation unit 40, a DC control command value generation unit 41, a circulating current control command value generation unit 42, a capacitor voltage control command value generation unit 43, and an arm voltage command value generation unit 44.

AC control command value generation unit 40 generates an AC voltage command value in each phase based on: U-, V-, and W-phase AC voltage values Vacu, Vacv, and Vacw (collectively referred to as an AC voltage value Vac); U-, V-, and W-phase AC current values Iacu, Iacv, and Iacw (collectively referred to as an AC current value Iac); active power command value Pref, and reactive power command value Qref. AC control command value generation unit 40 is formed of a feedback controller such as a proportional-integral-differential (PID) controller, for example.

DC control command value generation unit 41 first calculates a DC current value Idc based on arm currents Ipu, Inu, Ipv, Inv, Ipw, and Inw in their respective phases. Specifically, assuming that the sum of upper arm currents Ipu, Ipv, and Ipw is defined as Idc_p and the sum of lower arm currents Inu, Inv, and Inw is defined as Idc_n, direct current value Idc can be calculated by the following equation.

$$Idc=(Idc\_p+Idc\_n)/2 \quad (2)$$

DC control command value generation unit 41 generates a DC voltage command value based on: DC voltage values Vdcp and Vdcn detected by DC voltage detectors 11A and 11B, respectively; the calculated direct current Idc; and active power command value Pref. DC control command value generation unit 41 is formed of a feedback controller such as a PID controller, for example.

Circulating current control command value generation unit 42 first calculates circulating currents Iccu, Iccv, and Iccw that flow through leg circuits 4u, 4v, and 4w, respectively, based on arm currents Ipu, Inu, Ipv, Inv, Ipw, and Inw in their respective phases. The circulating current used herein means a current that circulates among a plurality of leg circuits 4. For example, circulating current Iccu flowing through U-phase leg circuit 4u is represented by the following equation.

$$Iccu=(Ipu+Inu)/2-Idc/3 \quad (3)$$

The first term in the above-mentioned equation (3) represents a current that flows in common through upper arm 5 and lower arm 6 of leg circuit 4u. The second term in the above-mentioned equation (3) represents an amount of direct current Idc that is shared by U-phase leg circuit 4u assuming that direct current Idc flows equally through each leg circuit. Circulating currents Iccv and Iccw can also be similarly calculated.

Circulating current control command value generation unit 42 calculates the command value of the circulating current in each phase based on calculated circulating currents Iccu, Iccv, and Iccw in their respective phases and average value Vcapavg of the cell capacitor voltage averaged for each arm circuit. Circulating current control command value generation unit 42 is formed of a feedback controller such as a ND controller, for example.

Based on average value Vcapavg of the cell capacitor voltage averaged for each arm circuit and arm currents Ipu, Inu, Ipv, Inv, Ipw and Inw in their respective phases, capacitor voltage control command value generation unit 43 generates a voltage command value of the DC capacitor in convener cell 7 in each of the upper arm and the lower arm in each phase. More specifically, capacitor voltage control command value generation unit 43 controls the total average cell capacitor voltage in the U-, V-, and W-phase upper arms and the U-, V-, and W-phase lower arms to be set at a fixed value, controls the balance between the upper arm and the lower arm in each phase to be appropriately kept, and also controls the inter-phase balance to be appropriately kept. Capacitor voltage control command value generation unit 43 is formed of a feedback controller such as a ND controller, for example.

Arm voltage command value generation unit 44 combines the outputs from the above-mentioned command value generation units 40 to 43 to thereby generate arm voltage command values 33 (Vprefu, Vnrefu, Vprefv, Vnrefv, Vprefw, Vnrefw) for upper arm 5 and lower arm 6 in each phase.

It is to be noted that the above-described configuration of converter controller 123 is merely by way of example, and the controller having another configuration can be applicable to the present embodiment.

[Configuration and Operation of Limiter Controller]

Figure 9:
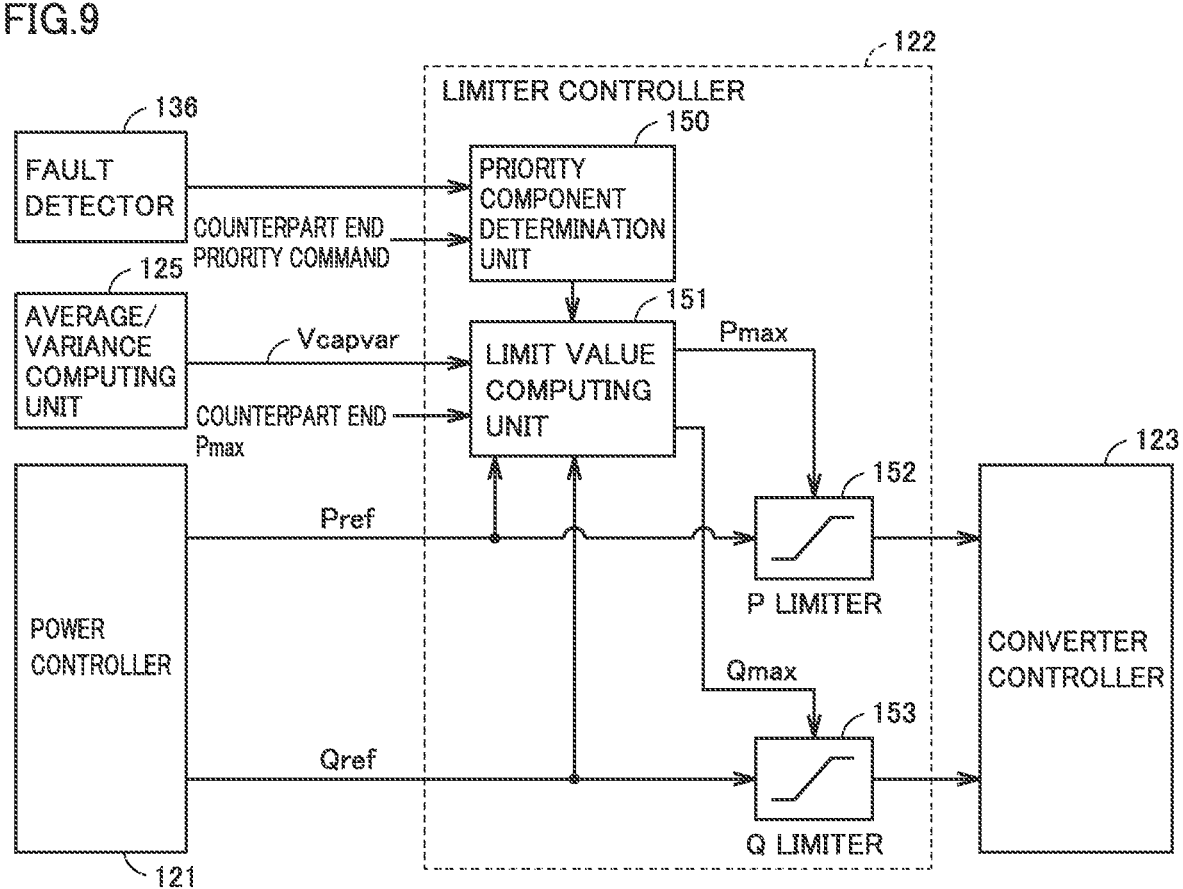
FIG. 9 is a block diagram showing the configuration of a liter controller for each VSC in FIG. 1.

FIG. 9 is a block diagram showing the configuration of a limiter controller for each VSC in FIG. 1. Referring to FIG. 9, limiter controller 122 includes a priority component determination unit 150, a limit value computing unit 151, a P limiter 152, and a Q limiter 153.

(P Priority Mode and Q Priority Mode)

Limiter controller 122 operates in operation triodes including a P priority mode and a Q priority mode. In the present specification, the P priority mode may be referred to as the first operation mode while the Q priority mode may be referred to as the second operation mode.

The P priority mode is an operation mode in a normal state in which no fault occurs in each of AC power systems 112A and 112B. In the P priority mode, active power limit value Pmax and reactive power limit value Qmax are set in advance such that the square root of the sum of the squares becomes equal to or less than an apparent power limit value that is set in accordance with the device capacity. Usually, in the P priority mode, limit value Pmax is set to be larger than limit value Qmax.

The Q priority mode is an operation mode in which a fault occurs in at least one of AC power systems 112A, 112B and reactive power control is required. VSC 110 on the system side on which a fault occurs is required to output reactive power having a larger absolute value in order to suppress a decrease in voltage in AC power system 112 resulting from a fault, and also in order to prevent an overvoltage in AC power system 112 from occurring after recovery from a fault. Accordingly, in the Q priority mode, reactive power limit value Qmax on the system side on which a fault occurs is set to be larger than that in the P priority mode while active power limit value Pmax on the system side on which a fault occurs is set to be smaller than that in the P priority mode. In addition, it is not necessarily effective for every system fault to expand the range in which reactive power can be controlled. Accordingly, it should be noted that the Q priority mode is an operation mode that should be selected only upon occurrence of a system fault that requires reactive power control.

On the other hand, in the normal AC power system side in which no fault occurs in the Q priority mode, reactive power limit value Qmax does not need to be set to be larger than that in the P priority mode. However, since active power limit value Pmax needs to be set to be equal to active power limit value Pmax on the system side on which a fault occurs, active power limit value Pmax is in many cases set to be smaller than that in the P priority mode.

(Priority Component Determination Unit)

Priority component determination unit 150 determines the operation mode of limiter controller 122 on its own end based on: the output from fault detector 136 on its own end side; and the operation mode (that is, a P priority mode or a Q priority mode) of limiter controller 122 on the counterpart end, which is received through communication device 124.

Figure 10:
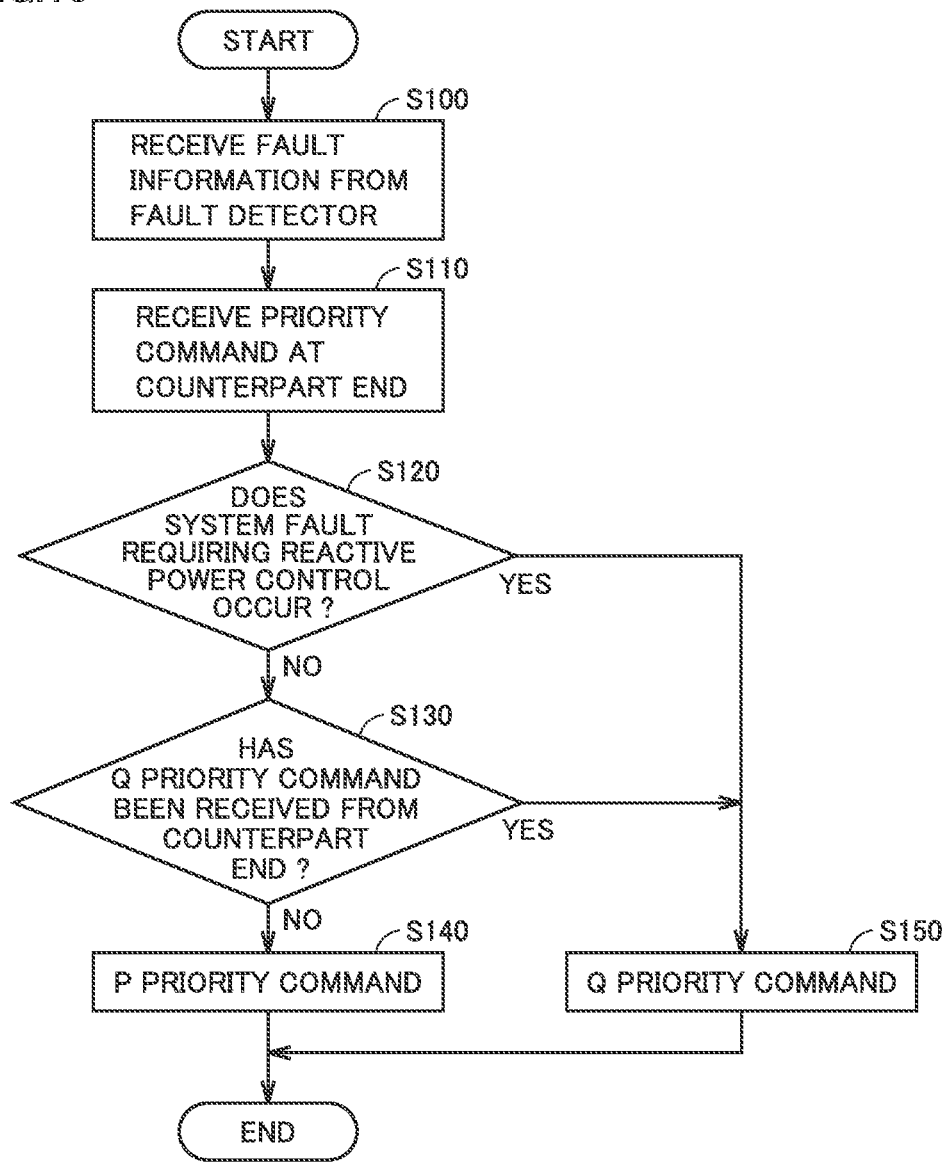
FIG. 10 is a flowchart illustrating the operation of a priority component determination unit in FIG. 9.

FIG. 10 is a flowchart illustrating the operation of the priority component determination unit in FIG. 9. Referring to FIGS. 9 and 10, in step S100, from fault detector 136 on its own end side, priority component determination unit 150 obtains the information as to whether a fault (for example, an abrupt change in electric quantity) occurs or not in AC power system 112 on its own end side. In step S110, priority component determination unit 150 obtains information about the operation mode (that is, a P priority mode or a Q priority mode) from limiter controller 122 on the counterpart end through communication devices 124A and 124B. Either of steps S100 and S110 may be performed first, or steps S100 and S110 may be concurrently performed.

In the subsequent step S120, based on the information from fault detector 136 on its own end side, priority component determination unit 150 determines whether a fault requiring reactive power control occurs or not in AC power system 112 on its own end side. When a fault requiring reactive power control occurs in AC power system 112 on its own end side (YES in step S120), priority component determination unit 150 outputs a Q priority command to limit value computing unit 151 in order to change the operation mode to a Q priority mode. In this case, priority component determination unit 150 further outputs a priority command to priority component determination unit 150 in limiter controller 122 on the counterpart end.

In the subsequent step S130, priority component determination unit 150 determines whether the Q priority command has been received or not from limiter controller 122 on the counterpart end. When the Q priority command has been received from limiter controller 122 on the counterpart end (YES in step S130), priority component determination unit 150 outputs a Q priority command to limit value computing unit 151 in order to change the operation mode to a Q priority mode. Either of steps S120 and S130 may be performed first, or steps S120 and S130 may be concurrently performed.

When it is determined as NO in each of steps S120 and S130, priority component determination unit 150 outputs a P priority command in step S140.

(Limit Value Computing Unit)

Limit value computing unit 151 determines active power limit value Pmax and reactive power limit value Qmax based on the following signals.

(i) The priority command received from priority component determination unit 150 on its own end (a P priority command or a Q priority command)

(ii) Active power limit value Pmax on the counterpart end, which is received from limiter controller 122 on the counterpart end (iii) Active power command value Pref and reactive power command value Qref received from power controller 121 on its own end (iv) Variance Vcapvar as an index value of the variation in cell capacitor voltage Vcap that is input from average/variance computing unit 125

In the P priority mode, limit value computing unit 151 basically sets limit values Pmax and Qmax at values that are set in advance. In this case, the square root of the sum of the square of active power limit value Pmax and the square of reactive power limit value Qmax is set to be equal to an apparent power limit value Smax or to be smaller than apparent power limit value Smax.

However, active power limit value Pmax needs to be set at the same value at its own end and the counterpart end. Accordingly, when active power limit value Pmax on the counterpart end that is received from limiter controller 122 on the counterpart end is smaller than active power limit value Pmax determined by the above-mentioned calculation, active power limit value Pmax on its own end is set to be equal to limit value Pmax received from the counterpart end.

Furthermore, when variance Vcapvar of the cell capacitor voltage received from average/variance computing unit 125 exceeds a threshold value, limit value computing unit 151 changes active power limit value Pmax into a value smaller than the above-mentioned predetermined value. Thereby, control of VSC 110 can be maintained with stability. Final active power limit value Pmax at the own end is set at a smaller value among: active power limit value Pmax at the counterpart end; and active power limit value Pmax limited for suppressing a variation in cell capacitor voltage Vcap.

In this case, it should be noted that the value of cell capacitor voltage Vcap oscillates with the fundamental frequency of AC power system 112. This oscillation width becomes smaller as the capacitance value of DC capacitor 24 is larger. However, due to limitations on cost and space, the oscillation width of about 15% to 20% of the median value may be designed to be allowed in many cases, for example. Furthermore, when the output voltage of each converter cell 7 is controlled in a phase shift pulse width modulation (PWM) scheme, the carrier signal differs in phase even at cell capacitor voltage Vcap of converter cell 7 in the same arm, which causes a difference in cell capacitor voltage Vcap. Accordingly, the above-mentioned threshold value for suppressing a variation in cell capacitor voltage Vcap is determined in consideration of the difference in cell capacitor voltage Vcap, which is essentially produced in each converter cell 7.

In the Q priority mode, limit value computing unit 151 sets reactive power limit value Qmax at a predetermined value larger than the value in the P priority mode. For example, limit value computing unit 151 sets limit value Qmax at apparent power limit value Smax that is based on the device capacity of VSC 110 on its own end side. On the other hand, active power limit value Pmax in the Q priority mode is determined by calculation based on reactive power command value Qref on its own end. For example, limit value computing unit 151 sets limit value Pmax according to the following equation (4). In the following equation (4), Smax represents the apparent power limit value that is based on the device capacity of VSC 110 on its own end side.

[Equation 1]

$$Pmax = \sqrt{Smax^2 - Qref^2} \quad (4)$$

It is to be noted that active power limit value Pmax needs to be set at the same value at its own end and the counterpart end. Thus, when active power limit value Pmax on the counterpart end received from limiter controller 122 on the counterpart end is smaller than limit value Pmax determined by the above-mentioned calculation, limit value Pmax on its own end is set not at a value calculated by the above-mentioned equation (4) but at a value equal to limit value Pmax received from the counterpart end.

Furthermore, when variance Vcapvar of the cell capacitor voltage received from average/variance computing unit 125 exceeds the threshold value, limit value computing unit 151 changes active power limit value Pmax to a value smaller than the value obtained by the above-mentioned equation (4). Thereby, control of VSC 110 can be maintained with stability. Final active power limit value Pmax on its own end is set at a smaller value among: active power limit value Pmax on the counterpart end; and active power limit value Pmax limited for suppressing a variation in cell capacitor voltage Vcap.

(P Limiter and Q Limiter)

P limiter 152 limits the value of active power command value Pref received from power controller 121 to fall within a range in accordance with active power limit value Pmax determined by limit value computing unit 151. Similarly, Q limiter 153 limits the value of reactive power command value Qref received from power controller 121 to fall within a range in accordance with reactive power limit value Qmax determined by limit value computing unit 151.

[Effects of First Embodiment]

As described above, according to the power conversion system in the first embodiment, in the Q priority mode, active power limit value Pmax is set at a value calculated according to the above-mentioned equation (4) using reactive power command value Qref. Thereby, the device capacity of the VSC can be effectively utilized while the output amount of the active power in the Q priority mode can be increased.

Furthermore, when the variation in cell capacitor voltage Vcap in each converter cell 7 is large enough to exceed a threshold value, the value of active power limit value Pmax is changed to a smaller value. This can avoid a situation that the feedback control of the cell capacitor voltage becomes unstable, so that the continuous operation of the MMC becomes difficult.

Second Embodiment

In the second embodiment, further details about the operation of limit value computing unit 151 in FIG. 9 will be described. A specific method differs according to a method of calculating a variance of cell capacitor voltage Vcap by average/variance computing unit 125. According to the first method, average/variance computing unit 125 calculates a variance of cell capacitor voltage Vcap in each arm.

[Details of Operation of Limit Value Computing Unit]

Specifically, in the first method, a variance Varup in the U-phase upper arm is calculated according to the following equation (5). In the following equation (5), the number of converter cells 7 in the U-phase upper arm is defined as N, the i-th (1≤i≤N) cell capacitor voltage in the ti-phase upper arm is defined as Vcapup(i), and the average value of the cell capacitor voltage in the U-phase upper arm is defined as Avgup.

[Equation 2]

$$Varup = \frac{1}{N} \sum_{i=1}^{N} (Vcapup(i) - Avgup)^2 \quad (5)$$

$$Avgup = \frac{1}{N} \sum_{i=1}^{N} Vcapup(i)$$

The variance of cell capacitor voltage Vcap in each of other arms, that is, a variance Varvp in the V-phase upper arm, a variance Varvn in the V-phase lower arm, a variance Varwp in the W-phase upper am, and a variance Varwn in the W-phase lower arm can also be similarly calculated.

FIG. 11 is a block diagram showing the operation of the limit value computing unit in FIG. 9. FIG. 11(A) shows the operation in the P priority mode while FIG. 11(B) shows the operation in the Q priority mode.

Referring to FIG. 11(A), an explanation will be given with regard to the case in the P priority mode. In this case, limit value computing unit 151 includes a maximum value determination unit: (Max) 160, a limiter adjustment amount computing unit 161, a subtractor 162, minimum value determination units (Min) 163, 170, a sign inverter (−1) 164, a limiter 165, and a reactive power limit value computing unit 166. Furthermore, reactive power limit value computing unit 166 includes a multiplier 167, a subtractor 168, and a square root computing unit (Sqrt(x)) 169.

First, maximum value determination unit 160 outputs the maximum value among variances of the cell capacitor voltages in their respective arms, which are calculated by average/variance computing unit 125.

Limiter adjustment amount computing unit 161 determines whether the maximum value of the variance of the cell capacitor voltage in each arm exceeds a threshold value or not. As a result of the determination, when the maximum value of the variance is equal to or less than the threshold value, limiter adjustment amount computing unit 161 outputs 0 as a limiter adjustment amount. When the maximum value of the variance exceeds the threshold value, limiter adjustment amount computing unit 161 outputs a positive value (for example, about 10% to 50% of set Pmax) as an limiter adjustment amount.

Subtractor 162 subtracts the limiter adjustment amount from active power limit value Pmax that is set in advance, to thereby generate adjusted active power limit value Pmax and output the generated value. When the maximum value of the variance of the cell capacitor voltage in each arm is equal to or less than the threshold value, the adjusted active power limit value Pmax is equal to original active power limit value Pmax that is set in advance.

Minimum value determination unit 163 outputs a smaller value: among the adjusted active power limit value Pmax and active power limit value Pmax on the counterpart end transmitted from the counterpart end. Thereby, final active power limit value Pmax is determined.

Limiter 165 limits the present active power command value Pref to fall within the range of the upper limit and the lower limit. The upper limit of limiter 165 is active power limit value Pmax that is finally determined while the lower limit of limiter 165 is an inversion of the sign of active power limit value Pmax by sign inverter 164.

Using active power command value Pref limited by limiter 165, reactive power limit value computing unit 166 calculates the maximum value that may be set as reactive power limit value Qmax according to the following equation (6).

[Equation 3]

$$Qmax = \sqrt{Smax^2 - Pref^2} \quad (6)$$

Specifically, multiplier 167 calculates the square of active power command value Pref. Subtractor 168 subtracts the square of active power command value Pref from the square of apparent power limit value Smax that is based on the device capacity of VSC 110 on its own end side. Square root computing unit 169 computes the square root of the subtraction result. As a result, reactive power limit value Qmax that can be set to the maximum possible extent is calculated.

Minimum value determination unit 170 outputs the smaller value among:

reactive power limit value Qmax that is calculated, by reactive power limit value computing unit 166 and that can be set to the maximum possible extent; and reactive power limit value Qmax that is originally set. Thereby, final reactive power limit value Qmax is determined.

The following is an explanation in the case of the Q priority mode with reference to FIG. 11(B). In this case, limit value computing unit 151 includes a maximum value determination unit (Max) 180, a limiter adjustment amount computing unit 181, a subtractor 182, a minimum value determination unit (Min) 189, a sign inverter (−1) 183, a limiter 184, and an active power limit value computing unit 185. Furthermore, active power limit value computing unit 185 includes a multiplier 186, a subtractor 187, and a square root computing unit (Sqrt(x)) 188.

In the Q priority mode, reactive power limit value Qmax is set at a prescribed value. On the other hand, active power limit value Pmax is determined according to the following procedure.

First, maximum value determination unit 180 outputs the maximum value among the variances of the cell capacitor voltages in their respective arms, which are calculated by average/variance computing unit 125.

Limiter adjustment amount computing unit 181 determines whether the maximum value of the variance of the cell capacitor voltage in each arm exceeds the threshold value or not. As a result of the determination, limiter adjustment amount computing unit 181 outputs zero as a limiter adjustment amount when the maximum value of the variance is equal to or less than the threshold value. Also, when the maximum value of the variance exceeds the threshold value, limiter adjustment amount computing unit 181 outputs a positive value (for example, about 10% to 50% of set Pmax) as a limiter adjustment amount.

Subtractor 182 subtracts the limiter adjustment amount from active power limit value Pmax that is set in advance, to thereby generate adjusted active power limit value Pmax and output the generated value. When the maximum value of the variance of the cell capacitor voltage in each arm is equal to or less than the threshold value, the adjusted active power limit value Pmax is equal to original active power limit value Pmax that is set in advance.

Limiter 184 limits the present reactive power command value Qref to fall within the range of the upper limit and the lower limit. The upper limit of limiter 184 is reactive power limit value Qmax while the lower limit of limiter 184 is an inversion of the sign of reactive power limit value Qmax sign inverter 183.

Using reactive power command value Qref limited by limiter 184, active power limit value computing unit 185 calculates the maximum value that may be set as active power limit value Pmax according to the above-mentioned equation (4). More specifically, multiplier 186 calculates the square of reactive power command value Qref Subtractor 187 subtracts the square of reactive power command value Qref from the square of apparent power limit value Smax that is based on the device capacity of VSC 110 on its own end side. Square root computing unit 188 computes the square root of the subtraction result. As a result, active power limit value Pmax that can be set to the maximum possible extent is calculated.

Minimum value determination unit 189 outputs, as a final active power limit value Pmax, the smallest value among: active power command value Pref that can be set to the maximum possible extent so as to correspond to reactive power command value Qref, active power limit value Pmax adjusted in accordance with the maximum value of the variance of cell capacitor voltage Vcap; and active power limit value max at the counterpart end.

[Modification of Operation of Limit Value Computing Unit]

According to the second method, average/variance computing unit 125 may calculate the variance of cell capacitor voltage Vcap in each of all converter cells 7 that constitute VSC 110. Specifically, a variance Var of cell capacitor voltage Vcap in the entire VSC 110 is calculated according to the following equation (7). In the following equation (7), the number of converter cells 7 in each arm is defined as N, the i-th cell capacitor voltage is defined as Vcap(i), and the average value of the cell capacitor voltage in the entire VSC 110 is defined as Avg.

[Equation 4]

$$\mathrm{Var} = \frac{1}{6N}\sum_{i=1}^{6N}(Vcap(i) - Avg)^2 \qquad (7)$$

$$Avg = \frac{1}{6N}\sum_{i=1}^{6N}Vcap(i)$$

FIG. 12 is a block diagram showing the operation of the limit value computing unit as a modification in FIG. 11. FIG. 12(A) shows the operation in the P priority mode while FIG. 12(B) shows the operation in the W priority mode.

The block diagram in FIG. 12(A) is different from the block diagram in FIG. 11(A) in that maximum value determination unit 160 is not provided. In FIG. 12(A), the value of variance Var of the voltage in all of the capacitors is input into limiter adjustment amount computing unit 161. Limiter adjustment amount computing unit 161 determines whether variance Var of the voltage in all of the capacitors exceeds the threshold value or not. As a result of the determination, limiter adjustment amount computing unit 161 outputs zero as a limiter adjustment amount when variance Var is equal to or less than the threshold value. When variance Var exceeds the threshold value, limiter adjustment amount computing unit 161 outputs a positive value (for example, about 10% to 50% of set Pmax) as a limiter adjustment amount.

Since other features in FIG. 12(A) are the same as those in FIG. 11(A), the same or corresponding components will be designated by the same reference characters, and the description thereof will not be repeated.

The block diagram in FIG. 12(B) is different from the block diagram in FIG. 11(B) in that maximum value determination unit 180 is not provided, in FIG. 12(B), the value of variance Var of the voltage in all of the capacitors is input into limiter adjustment amount computing unit 181. Limiter adjustment amount computing unit 181 determines whether variance Var of the voltage in all of the capacitors exceeds the threshold value or not. As a result of the determination, limiter adjustment amount computing unit 181 outputs zero as a limiter adjustment amount when variance Var is equal to or less than the threshold value. When variance Var exceeds the threshold value, limiter adjustment amount computing unit 181 outputs a positive value (for example, about 10% to 50% of set Pmax) as a limiter adjustment amount.

Since other features in FIG. 12(B) are the same as those in FIG. 11(B), the same or corresponding components will be designated by the same reference characters, and description thereof will not be repeated.

[Other Modifications of Operation of Limit Value Computing Unit]

In the following explanation, the average value of the cell capacitor voltage in the U-phase upper arm is defined as Avgup, and the average value of the cell capacitor voltage in the U-phase lower arm is defined as Avgun. Similarly, the average value of the cell capacitor voltage in the V-phase upper arm is defined as Avgvp, and the average value of the cell capacitor voltage in the V-phase lower arm is defined as Avgvn. The average value of the cell capacitor voltage in the W-phase upper arm is defined as Avgwp, and the average value of the cell capacitor voltage in the W-phase lower arm is defined as Avgwn.

According to the third method, average/variance computing unit 125 may calculate a variance Vararm of these six average values. Specifically, variance Vararm of the cell capacitor voltage is calculated according to the following equation (8). In the following equation (8), the average of the average values of the above-mentioned six cell capacitor voltages is defined as Avgarm.

[Equation 5]

$$Vararm = \frac{1}{6}[(Avgup - Avgarm)^2 + (Avgun - Avgarm)^2 + \\ (Avgvp - Avgarm)^2 + (Avgvn - Avgarm)^2 + \\ (Avgwp - Avgarm)^2 + (Avgwn - Avgarm)^2] \quad (8)$$

Figure 13:
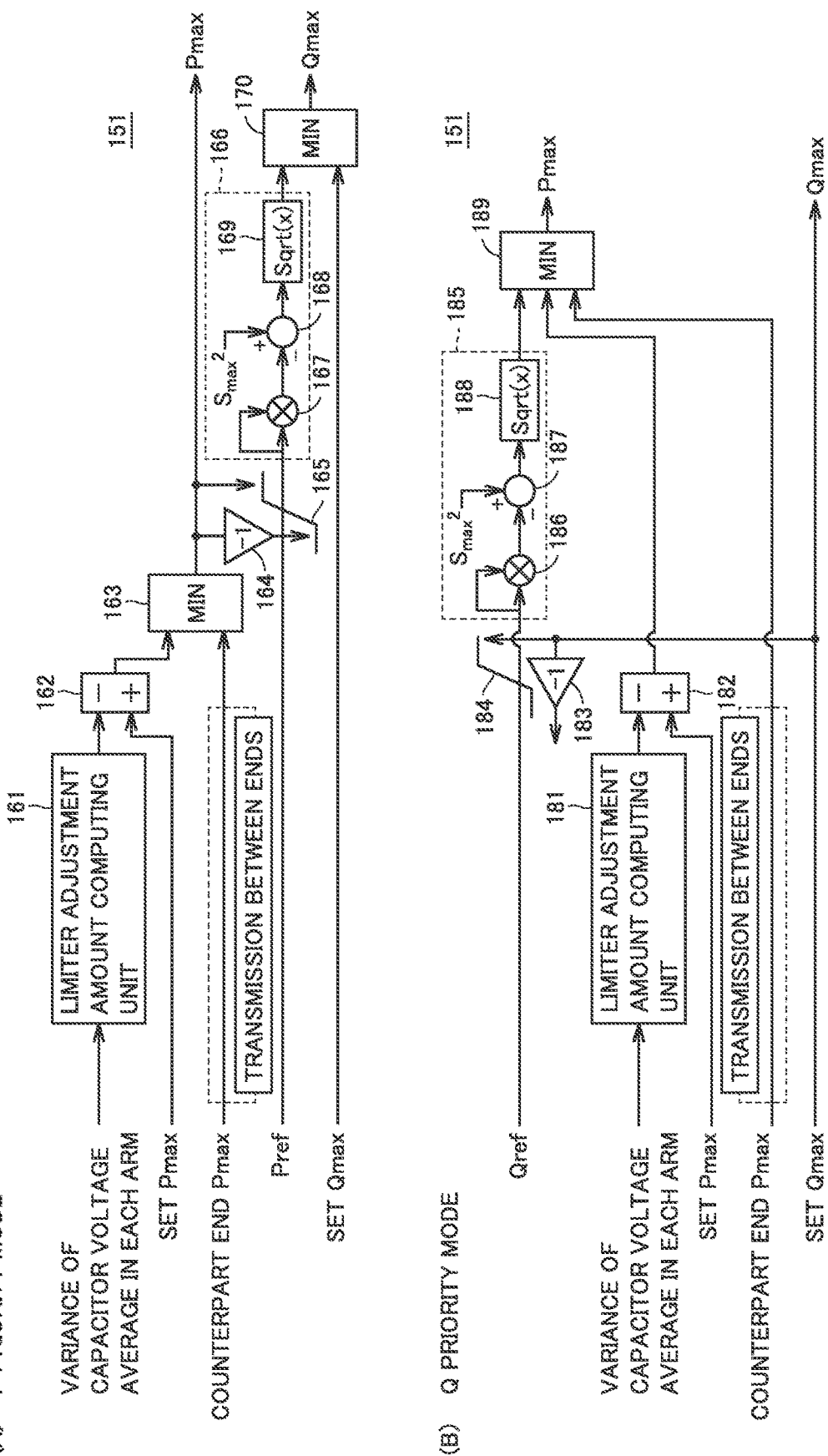
FIG. 13 is a block diagram showing the operation of the limit value computing unit as another modification in FIG. 11.

FIG. 13 is a block diagram showing the operation of the limit value computing unit as another modification in FIG. 11. FIG. 13(A) shows the operation in the P priority mode while FIG. 13(B) shows the operation in the Q priority mode.

The block diagram in FIG. 13(A) is different from the block diagram in FIG. 11(A) in that maximum value determination unit 160 is not provided. In FIG. 13(A), the value of variance Vararm of the arm average voltage represented in the equation (8) is input into limiter adjustment amount computing unit 161. Limiter adjustment amount computing unit 161 determines whether variance Vararm of the arm average voltage exceeds the threshold value or not. As a result of the determination, when variance Vararm of the arm average voltage is equal to or less than the threshold value, limiter adjustment amount computing unit 161 outputs zero as a limiter adjustment amount. When variance Vararm of the arm average voltage exceeds the threshold value, limiter adjustment amount computing unit 161 outputs a positive value (for example, about 10% to 50% of set Pmax) as a limiter adjustment amount.

Since other features in FIG. 13(A) are the same as those in FIG. 11(A), the same or corresponding components will be designated by the same reference characters, and description thereof will not be repeated.

The block diagram in FIG. 13(B) is different from the block diagram in FIG. 11(B) in that maximum value determination unit 180 is not provided. In FIG. 13(B), the value of variance Vararm of the arm average voltage represented in the equation (8) is input into limiter adjustment amount computing unit 181. Limiter adjustment amount computing unit 181 determines whether variance Vararm of the arm average voltage exceeds the threshold value or not. As a result of the determination, when variance Vararm of the arm average voltage is equal to or less than the threshold value, limiter adjustment amount computing unit 181 outputs zero as a limiter adjustment amount. When variance Vararm of the arm average voltage exceeds the threshold value, limiter adjustment amount computing unit 181 outputs a positive value (for example, about 10% to 50% of set Pmax) as a limiter adjustment amount.

Since other features in FIG. 13(B) are the same as those in FIG. 11(B), the same or corresponding components will be designated by the same reference characters, and description thereof will not be repeated.

[Effects of Second Embodiment]

As described above, according to the power conversion system in the second embodiment, when the index value of the variation in the cell capacitor voltage (that is, the maximum value of the variance in each arm in the case of FIG. 11, the variance of the voltage in all of the capacitors in the case of FIG. 12, and the variance of the arm average voltage in the case of FIG. 13) becomes larger enough to exceed the threshold value, active power limit value Pmax becomes smaller. As a result, since the transmission power is reduced, the variation in the value of the cell capacitor voltage can be suppressed, so that the operation of the MMC-type VSC can be continued.

Particularly in the case where the variance of the voltage in all of the capacitors is used as an index value as shown in FIG. 12, variations can be effectively suppressed when the cell capacitor voltage balance is lost not only within the arm but also between the arms. Also when the variance of the arm average voltage is used as an index value as shown FIG. 13, the computing time and resource required for computing the variance in average/variance computing unit 125 can be reduced.

Third Embodiment

The third embodiment will be described with regard to more specific configurations of limiter adjustment amount computing unit 161 in FIGS. 11(A), 12(A) and 13(A) and limiter adjustment amount computing unit 181 in FIGS. 11(B), 12(B) and 13(B).

[Configuration of Limiter Adjustment Amount Computing Unit]

Figure 14:
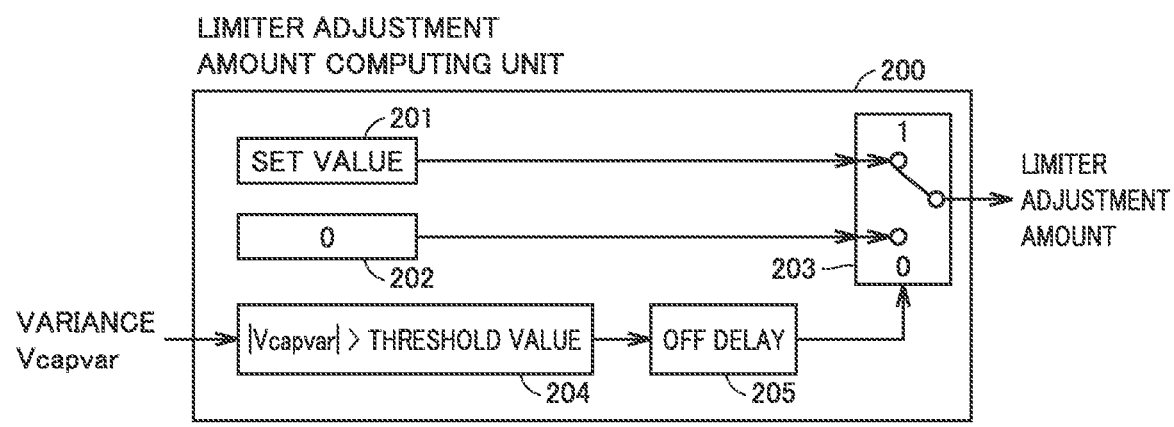
FIG. 14 is a block diagram showing the configuration of a limiter adjustment amount computing unit.

FIG. 14 is a block diagram showing the configuration of the limiter adjustment amount computing unit. A limiter adjustment amount computing unit 200 in FIG. 14 corresponds to limiter adjustment amount computing unit 161 in FIGS. 11(A), 12(A) and 13(A) and limiter adjustment amount computing unit 181 in FIGS. 11(B), 12(B) and 13(B).

Referring to FIG. 14, limiter adjustment amount computing unit 200 includes a register 201 in which the set value of the limiter adjustment amount is stored, a register 202 in which "0" is stored, a changeover switch 203, a comparator 204, and an off-delay timer 205. The set value stored in register 201 is a value of about 10% to 50% of standard active power limit value Pmax, for example.

Comparator 204 receives an input of the calculation result of variance Vcapvar of the cell capacitor voltage, in this case, variance Vcapvar may be the maximum value of the variance in each arm as described with reference to FIG. 11, may be a voltage variance in all of the capacitors as described with reference to FIG. 12, or may be a variance of the arm average voltage as described with reference to FIG. 13. Comparator 204 outputs "1" to off-delay timer 205 when variance Vcapvar is larger than the threshold value, and outputs "0" to off-delay timer 205 when variance Vcapvar is equal to or less than the threshold value.

When the input is changed from "0" to "1", off-delay timer 205 immediately changes the output to "1". As a result, changeover switch 203 is switched to "1", so that the set value stored in register 201 is output as a limiter adjustment amount.

On the other hand, when the input is changed from "1" to "0", off-delay timer 205 changes the output from "1" to "0" after a lapse of a predetermined delay time. Accordingly, when the input of off-delay tinier 205 is returned to "1" before a lapse of the above-mentioned delay time, the output of off-delay timer 205 does not change and remains at "1".

When the output of off-delay timer 205 is changed to "0", changeover switch 203 is switched to "0", with the result that "0" stored in register 202 is output as a limiter adjustment amount.

In other words, when variance Vcapvar exceeding the threshold value returns to variance Vcapvar equal to or less than the threshold value, and when the state where variance Vcapvar is equal to or less than the threshold value continues for the above-mentioned delay time, limiter adjustment amount computing unit 200 sets the limiter adjustment amount back to "0" from the set value stored in register 201.

[Effects of Third Embodiment]

According to the configuration of limiter adjustment amount computing unit 200 as described above, the limit value can be prevented from oscillating, even when variance Vcapvar of the cell capacitor voltage oscillates in a short period.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS UST 2 power conversion circuit, 4 leg circuit, 5 upper arm, 6 lower arm, 7 converter cell, 9A, 9B arm current detector, 11A, 11B DC voltage detector, 21 gate control unit. 22A, 22B, 22C, 22D switching element, 23A, 23B, 23C, 23D diode, 24 DC capacitor, 27 voltage detection unit, 28 transmission and reception unit, 32 repeater, 33, Vnrefu, Vnrefv, Vnrefw, Vprefu, Vprefv, Vprefw arm voltage command value, 40 AC control command value generation unit, 41 DC control command value generation unit, 42 circulating current control command value generation unit, 43 capacitor voltage control command value generation unit, 44 arm voltage command value generation unit. 100 power conversion system, 111 DC circuit, 112 AC power system, 120 central controller, 1.21 power controller, 122 limiter controller, 123 converter controller, 124, 138 communication device, 125 average/variance computing unit (index value calculation unit), 133 current transformer, 134 voltage transformer, 135 electric quantity detector, 136 fault detector, 150 priority component determination unit, 151 limit value computing wilt, 152 P limiter, 153 Q limiter, lace, lacy, lacw AC current, Iccu, Iccv, Iccw circulating current, Idc direct current, Inu, Inv, Inw, Ipu, Ipv, Ipw arm current, Nn negative-side DC terminal, Np positive-side DC terminal, Nu, Nv, Nw AC terminal, Nu AC input terminal, Pmax active power limit value, Pref active power command value, Qmax reactive power limit value, Qref reactive power command value, Smax apparent power limit value, Vacu, Vary, Vacw AC voltage, Vcapvar variance, Vcap cell capacitor voltage, Vcapavg average value, Vdcn, Vdcp DC voltage.

The invention claimed is:

1. A power conversion device comprising:
   a power conversion circuit configured to perform power conversion between an AC power system and a DC power system, the power conversion circuit including a plurality of converter cells that are cascade-connected to each other, each of the plurality of converter cells including an energy storage device; and
   a central controller configured to:
      limit an active power command value and a reactive power command value to a value corresponding to an active power limit value and a value corresponding to a reactive power limit value, respectively; and
      control an operation of the power conversion circuit according to the limited active power command value and the limited reactive power command value,
   the central controller including:
      an index value calculation unit configured to calculate an index value that shows an extent of a variation among voltages of the energy storage devices included in the plurality of converter cells; and
      a limiter controller configured to change the active power limit value to a value smaller than the active power limit value when the index value exceeds a threshold value.

2. The power conversion device according to claim 1, wherein
   the power conversion circuit includes, in each phase of the AC power system:
      an upper arm circuit connected to a positive-side terminal of the DC power system; and
         a lower arm circuit connected to a negative-side terminal of the DC power system, and
      each of the upper arm circuit and the lower arm circuit includes the plurality of converter cells that are cascade-connected to each other.

3. The power conversion device according to claim 2, wherein the index value calculation unit is configured to, in said each phase of the AC power system: calculate a variance of voltages of the energy storage devices in the plurality of converter cells constituting the upper arm circuit, and calculate a variance of voltages of the energy storage devices in the plurality of converter cells constituting the lower arm circuit, and the index value calculation unit is configured to use a maximum value of the calculated variances as the index value.

4. The power conversion device according to claim 2, wherein
   the index value calculation unit is configured to calculate a variance of voltages of the energy storage devices in all of the plurality of converter cells constituting the power conversion circuit, and
   the index value calculation unit is configured to use the calculated variance as the index value.

5. The power conversion device according to claim 2, wherein the index value calculation unit is configured to, in said each phase of the AC power system: calculate an average value of voltages of the energy storage devices in the plurality of converter cells constituting the upper arm circuit, and calculate an average value of voltages of the energy storage devices in the plurality of converter cells constituting the lower arm circuit, and the index value calculation unit is configured to use a variance of the calculated average values as the index value.

6. The power conversion device according to claim 1, wherein
   the limiter controller is configured to set the active power limit value back to an original value when the index value exceeding the threshold value returns to the index value equal to or less than the threshold value, and when a state where the index value is equal to or less than the threshold value continues for a predetermined time period.

7. The power conversion device according to claim 1, wherein
   the central controller operates in operation modes including a first operation mode and a second operation mode, in the second operation mode, the limiter controller is configured to set the reactive power limit value at a prescribed value, and in the first operation mode, the limiter controller is configured to set the reactive power limit value at a smaller value among:
- a value calculated based on the active power command value; and
- the prescribed value.

8. The power conversion device according to claim 7, wherein the power conversion device is connected to another power conversion device through the DC power system, and in the first operation mode, the limiter controller is configured to set the active power limit value as a final value at a smaller value among:
- the active power limit value that is set based on the index value; and
- an active power limit value that is used in the another power conversion device.

9. The power conversion device according to claim 8, wherein in the second operation mode, the limiter controller is configured to set the active power limit value as a final value at a smallest value among:
- a value that is calculated based on the reactive power command value;
- the active power limit value that is set based on the index value; and
- the active power limit value that is used in the another power conversion device.

* * * * *